US012783735B2

(12) United States Patent
Buban

(10) Patent No.: US 12,783,735 B2
(45) Date of Patent: Nov. 3, 2026

(54) USING TIMESTAMPS TO PREVENT DATA TAMPERING

(71) Applicant: Microsoft Technology Licensing, LLC, Redmond, WA (US)

(72) Inventor: Garret Buban, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 165 days.

(21) Appl. No.: 18/450,856

(22) Filed: Aug. 16, 2023

(65) Prior Publication Data

US 2025/0061234 A1 Feb. 20, 2025

(51) Int. Cl.
*G06F 21/64* (2013.01)
*G06F 21/60* (2013.01)
*H04L 9/32* (2006.01)

(52) U.S. Cl.
CPC ............ *G06F 21/64* (2013.01); *G06F 21/602* (2013.01); *H04L 9/3297* (2013.01)

(58) Field of Classification Search
CPC ....... G06F 21/64; G06F 21/602; H04L 9/3297
See application file for complete search history.

(56) References Cited

U.S. PATENT DOCUMENTS

2004/0187006 A1* 9/2004 Trapp .................... H04L 63/083 713/176
2008/0040620 A1* 2/2008 Trapp ...................... G06F 21/78 713/193
2012/0110343 A1* 5/2012 Bandic .................. H04L 9/3297 713/189
2016/0371509 A1* 12/2016 Unitt ................. H04M 3/42221
2019/0156069 A1* 5/2019 Heo ........................ G06F 21/78
(Continued)

FOREIGN PATENT DOCUMENTS

CN 1841255 A 10/2006
CN 116232700 A * 6/2023

OTHER PUBLICATIONS

International Search Report and Written Opinion received for PCT Application No. PCT/US2024/039963, mailed on Jul. 3, 2025, 10 pages.
(Continued)

*Primary Examiner* — Trong H Nguyen

(57) ABSTRACT

Timestamps are used to prevent data tampering. A trusted data generator generates a concatenated data object including a data object and metadata, which includes a location indication, a timestamp, and, depending on the type of encryption, an integrity value. The trusted timestamp generator encrypts the concatenated data object, stores the encrypted concatenated data object (e.g., in untrusted storage) in accordance with a location indicated by the location indication, and protects the timestamp in trusted storage (e.g., by protecting at least the root timestamp). A trusted data validator extracts the data object and metadata from the decrypted concatenated data object and validates the data object by comparing the storage location to the extracted location indication, the protected timestamp to the extracted timestamp, and a calculated integrity value to the extracted integrity value. Timestamps may be validated without calculations and with tolerances, supporting performance customization/security optimization.

19 Claims, 8 Drawing Sheets

(56) References Cited

U.S. PATENT DOCUMENTS

2021/0064580 A1* 3/2021 Gao .................... G06F 16/9027
2023/0153470 A1* 5/2023 Villegas .................. G06F 21/51
713/193

OTHER PUBLICATIONS

International Preliminary Report on Patentability (Chapter I) received for PCT Application No. PCT/US2024/039963, mailed on Feb. 26, 2026, 07 pages.

* cited by examiner

USING TIMESTAMPS TO PREVENT DATA TAMPERING

BACKGROUND

Confidential computing is a collection of security and privacy-enhancing computational techniques focused on protecting data in use. Confidential computing may be performed on owned or third party computing devices (e.g., using cloud resources), and may use a trusted execution environment (TEE) to encrypt and decrypt sensitive data. While encryption ensures that the data cannot be accessed or tampered with outside of the trusted environment, encryption may not protect against tampering with data stored in untrusted storage being returned for a request. For example, a replay attack can be performed in which old data is returned for a new request. In another example of returning incorrect data, data for Object A can be returned as the data for Object B. The data may be determined to be valid but may be incorrect data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, apparatuses, methods, and computer program products are disclosed herein that use timestamps to prevent data tampering. In one aspect, a confidential computing system includes a trusted data generator, a trusted data validator, a trusted timestamp generator, and trusted timestamp storage. The trusted data generator is configured to generate a concatenated data object including a data object and metadata, which may include a location indication and a timestamp (e.g., and an integrity value). The trusted timestamp generator encrypts the concatenated data object (e.g., using authenticated encryption), stores the encrypted concatenated data object (e.g., in untrusted storage) in accordance with a location indicated by the location indication, and protects the timestamp in trusted storage (e.g., by protecting at least the root timestamp). Concatenating an integrity value may be used in a further aspect, such as when using authenticated encryption.

In a further aspect, the trusted data validator is configured to retrieve a timestamp protected by trusted storage, retrieve an encrypted concatenated data object from a storage location in storage, decrypt the concatenated data object, extract the data object and metadata from the decrypted concatenated data object, and validate the data object by confirming the metadata. The trusted data validator may compare the storage location to the location indication, compare the retrieved timestamp to the extracted timestamp, calculate a second integrity value based at least on the data object, and compare the second integrity value to the first integrity value.

A timestamp may be stored in a tree structure of timestamps. Addressing space can be partitioned into a tree structure, e.g., similar to a file system directory. Trusted communication links may be established. At least a timestamp of a root of the tree structure may be stored in trusted storage. As data is stored in untrusted storage, the timestamp in the directory above may be recorded. This process can continue back to the root, which is stored in trusted storage.

Unlike other trusted data implementations (e.g., Merkle Tree), timestamps may be compared without performing calculations, data may be validated with unequal comparisons, and comparisons and tolerances may be flexible, allowing for performance customization (e.g., security optimization). For example, a trusted data validator may be configured to validate an extracted timestamp if the extracted timestamp is equal to or greater than the timestamp retrieved from trusted storage.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
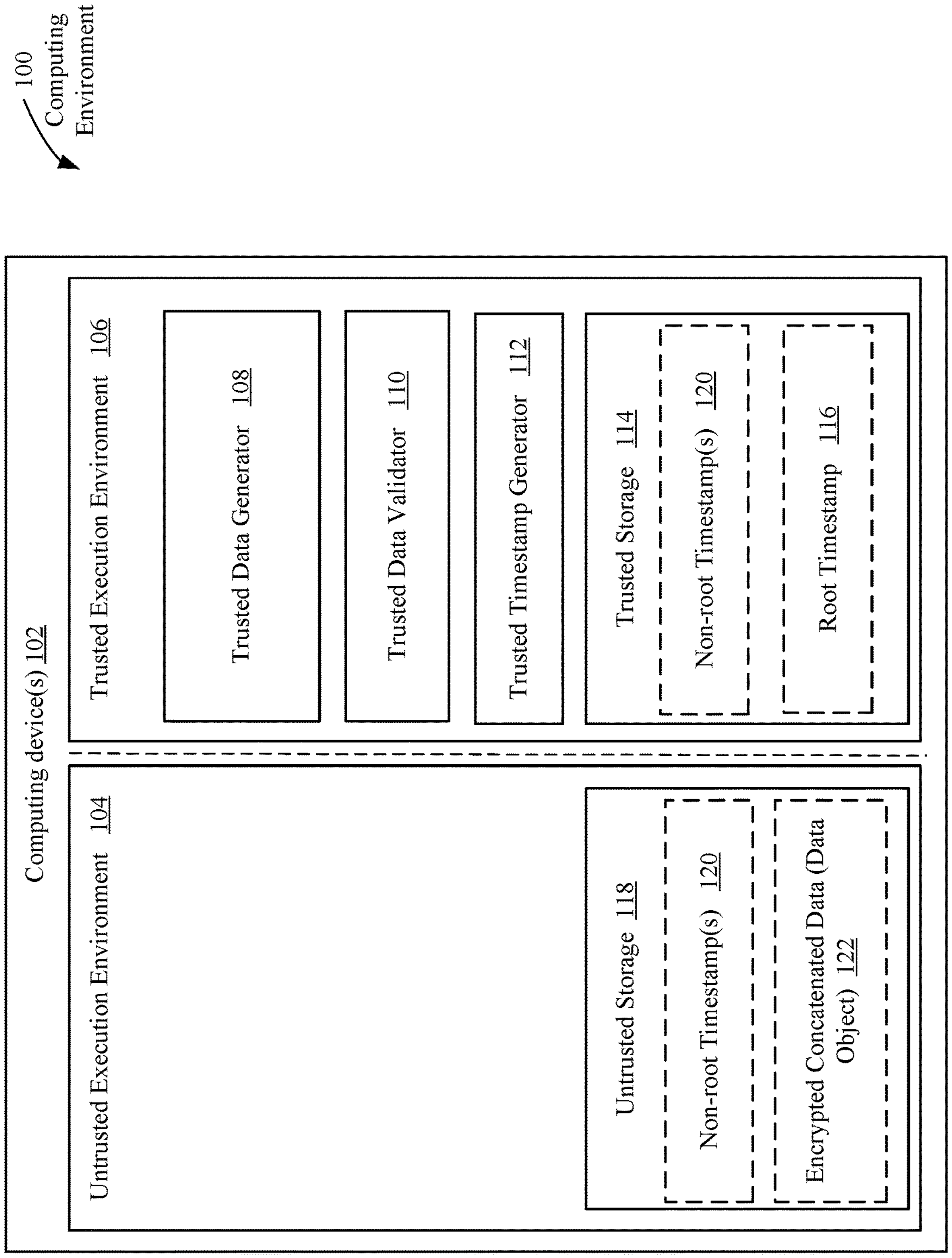
FIG. 1 shows a block diagram of an example of a computing environment configured to enable using timestamps to prevent data tampering, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Confidential computing is a collection of security and privacy-enhancing computational techniques focused on protecting data in use. Confidential computing may be performed on owned or third party computing devices (e.g., using cloud resources), and may use a trusted execution environment (TEE) to encrypt and decrypt sensitive data. While encryption ensures that the data cannot be accessed or tampered with outside of the trusted environment, encryption may not protect against tampering with data stored in untrusted storage being returned for a request. For example, a replay attack can be performed in which old data is returned for a new request. In another example of returning incorrect data, data for Object A can be returned as the data for Object B. The data may be determined to be valid but may be incorrect data. Thus, data outside of the trusted environment may not be effectively protected in a manner that allows for detection of data tampering.

Confidential computing may be used, for example, by a customer that does not trust a cloud computing platform to provide confidentiality. For example, a client may execute a workload in cloud virtual machines (VMs) as a confidential computing environment. A trusted execution environment (TEE) is a system of computing devices and trusted storage that is protected against data tampering (e.g., a malicious actor changing the data in an undesired manner). "Trusted storage" refers to data storage (e.g., solid state storage, hard disk drives, etc.) from which stored data may be retrieved without the data needing to be validated against the possibility of such tampering (the data retrieved from a TEE may still be validated against unintentional corruption). "Untrusted storage" refers to data storage from which retrieved data should be validated against the possibility of tampering. To protect against data tampering in a TEE, a TEE may decrypt data coming into the TEE, and may encrypt data before leaving the TEE. A TEE may securely run part of client code and securely store data in encrypted form in trusted storage. The data may be securely run and/or stored in this manner so that a third party hosting the machine(s) (e.g., computing devices) of the TEE cannot even access or otherwise see the data or code.

Encrypting the data protects data outside the TEE but does not provide confirmation that the data is correct. A misdirection attack provides data from a different location. Misdirection may be detected by including the address of the data inside the payload itself. A replay attack provides the wrong data (e.g., binary large object (BLOB)) to mislead. For example, a replay attack may send older data instead of newer data. A cyclic redundancy check (CRC) may determine that the data is valid, but the recipient may not know that the data is not the most current data.

A Merkle tree may be used to detect and prevent replay attacks. For example, a CRC may be performed for each chunk of data. In an example, there may be 1,000 CRCs for 1,000 chunks of data. The 1,000 CRCs may be split into 100 groups of 10. For each of the 10 groups there may be another CRC of the CRCs, resulting in an additional 100 CRCs. The 100 CRCs may be broken into 10 groups. For each of the 10 groups there may be another CRC of the CRCs. There may be a top or root CRC for the ten CRCs. A trusted source may be used to store at least the root CRC. Validation may be implemented by working up to the root in a series of calculations and comparisons. The values calculated for the data must match the stored CRC values in order to validate the data. When using a Merkle tree, every data update has to update the path all the way to the root, and every update has to be done serially, because the entire data set, however big, is being protected by one trusted CRC at the root. So, for example, if person A wants to update one area of the data, the update may change one CRC. The change in one CRC may reverberate through many CRCs, changing CRCs at every level up to the root. A person reading the data has to be able to get the correct root CRC for the version of the data that they're reading, so all of the CRC updates have to be done atomically with the actual data update.

A time reference may be used to detect and prevent replay attacks. The time reference may be compared to a known time, e.g., when the data was written, without performing computations. Data may be validated without computations. Timestamps may be compared without performing calculations. Time and energy may be conserved by avoiding computations. Data updates may also avoid computations. Data may be validated with equal and/or unequal comparisons. For example, a trusted data validator may be configured to validate an extracted timestamp if the extracted timestamp is equal to or greater than the timestamp retrieved from trusted storage. Timestamp comparisons and/or tolerances for differences may be flexible, allowing for performance customization (e.g., security optimization).

As such the use of timestamps brings advantages, as timestamps do not need to be updated. For example, in a scenario in which a replay attack is not a concern (such as correcting the spelling of someone's name), a system could choose not to update the timestamp stored with the data, and therefore not need to update timestamps back to the root. However, with a Merkle tree, any update that changes the data changes the CRCs, so the Merkle tree must be updated. In contrast, for timestamps, each update can be handled differently based on the protection level needed. For instance, an update that deposits money in an account may have its timestamp updated to prevent a replay attack. In contrast, an update that changes a user's background color preference does not need an updated timestamp, as the harm from a replay attack in such case is effectively zero.

Accordingly, embodiments described herein enable using timestamps to prevent data tampering. Data, storage location, timestamp, and integrity metadata may be included with data encryption. A confidential computing system may include a trusted data generator, a trusted data validator, a trusted timestamp generator, and trusted timestamp storage. A trusted data generator may be configured to generate a concatenated data object including a data object and metadata, which may include a location indication and a timestamp (e.g., and an integrity value). The trusted timestamp generator encrypts the concatenated data object (e.g., using authenticated encryption), stores the encrypted concatenated data object (e.g., in untrusted storage) in accordance with a location indicated by the location indication, and protects the timestamp in trusted storage (e.g., by protecting at least the root timestamp). Concatenating an integrity value may be optional, such as when using authenticated encryption or in other instances.

A trusted data validator may be configured to retrieve a timestamp protected by trusted storage; retrieve an encrypted concatenated data object from a storage location in (e.g., untrusted) storage; decrypt the concatenated data object; extract the data object and metadata (e.g., location indication, second timestamp, and integrity value) from the decrypted concatenated data object; and validate the data object by confirming the metadata. The trusted data validator may compare the storage location to the location indication; compare the retrieved timestamp to the extracted timestamp; calculate a second integrity value based at least on the data object; and compare the second integrity value to the first integrity value.

A timestamp may be stored in a tree structure of timestamps. Addressing space can be partitioned into a tree structure, e.g., similar to a file system directory. Trusted communication links may be established. At least a timestamp of a root of the tree structure may be stored in trusted storage. As data is stored in untrusted storage, the timestamp in the directory above may be recorded. This process can continue back to the root, which is stored in trusted storage.

Unlike other trusted data implementations (e.g., Merkle Tree), timestamps may be compared without performing calculations, data may be validated with unequal comparisons, and comparisons and tolerances may be flexible, allowing for performance customization (e.g., security optimization). For example, a trusted data validator may be configured to validate an extracted timestamp if the extracted timestamp is equal to or greater than the timestamp retrieved from trusted storage.

An example of trusted storage is memory inside a TEE. A trusted environment may be any environment where data is deemed safe in unprotected form, such as clear text. A trusted environment may include trusted processing/execution, memory, and/or storage. An untrusted environment may be any environment where unprotected data is deemed as risk to tampering (e.g., data manipulation, replay attacks, misdirection, etc.), where one or more of execution, memory, and storage, is/are not trusted.

To help illustrate the aforementioned systems and methods, FIG. 1 will now be described. In particular, FIG. 1 shows a block diagram of an example of a computing environment 100 ("environment 100" hereinafter) configured to enable using timestamps to prevent data tampering, in accordance with an embodiment. As shown in FIG. 1, environment 100 includes one or more computing devices 102. Multiple computing devices 102 may be communicatively coupled to each other, e.g., locally or via a network (not shown). When configured according to embodiments disclosed herein, a computing device 102 may be considered a confidential computing system. A network may comprise one or more networks, such as local area networks (LANs), wide area networks (WANs), enterprise networks, the Internet, etc., and may include one or more of wired and/or wireless portions.

Subject matter described herein applies to any trusted environment with untrusted storage, which may be on a single machine or multiple (e.g., networked) machines. In some examples, computing device(s) 102 may comprise a single computing device where the execution environment may be trusted, but the hard drive that data is being stored on may not be trusted because the computer is subject to attack.

In some examples, computing device(s) 102 may comprise cloud resources, e.g., a network-accessible set of computing devices referred to as a server set (e.g., a cloud-based environment or platform comprising a server inventory). A server inventory may be grouped geographically into regions and zones within regions. Servers may be organized, for example, as racks (e.g., groups of servers), clusters (e.g., groups of racks), data centers (e.g., groups of clusters), etc. A server infrastructure may include a management service 108 and one or more clusters. Each cluster may comprise a group of one or more nodes (also referred to as compute nodes) and/or a group of one or more storage nodes. Each node may be accessible via a network (e.g., in a "cloud-based" embodiment) to build, deploy, and manage applications and services. A node may be a storage node that comprises a plurality of physical storage disks that are accessible via a network and may be configured to store data associated with the applications and services managed by nodes.

Groups of clusters in any combination may represent a data center. In an embodiment, one or more clusters may be co-located (e.g., housed in one or more nearby buildings with associated components such as backup power supplies, redundant data communications, environmental controls, etc.) to form a data center, or may be arranged in other manners. In accordance with an embodiment, environment 100 comprises part of the Microsoft® Azure® cloud computing platform, owned by Microsoft Corporation of Redmond, Washington, although this is only an example and not intended to be limiting.

Each node may comprise one or more server computers, server systems, and/or computing devices. Each node may be configured to execute one or more software applications (or "applications") and/or services and/or manage hardware resources (e.g., processors, memory, etc.), which may be utilized by users (e.g., customers) of the network-accessible server set. Nodes may be configured for specific uses, e.g., based on allocations to fulfill customer requests. For example, a node may execute virtual machines (VMs). In some examples, each node in each cluster may be dynamically configured to execute VMs, VM clusters, ML workspaces, scale sets, etc. in response to customer requests (e.g., provided to a resource management service).

Computing device(s) 102 may each be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. Each of computing device(s) 102 may store data and execute computer programs, applications, and/or services. Each of computing device(s) 102 may represent a user-owned device (e.g., on or off premises) or a third party device (e.g., on or off premises), including any conceivable combination thereof.

For example, users may utilize computing device(s) 102 alone or to access remotely executed applications and/or services (e.g., cloud resource management service 108) offered by the network-accessible server set. For example, a user may be enabled to utilize the applications and/or services offered by the network-accessible server set by signing-up with a cloud services subscription with a service provider of the network-accessible server set (e.g., a cloud service provider). Upon signing up, the user may be given access to a portal of server infrastructure, not shown in FIG. 1. A user may access the portal via computing device(s) 102 (e.g., by a browser application executing thereon). For example, the user may use a browser executing on computing device 102 to traverse a network address (e.g., a uniform resource locator) to a portal of server infrastructure 104, which invokes a user interface (e.g., a web page) in a browser window rendered on computing device 102. The user may be authenticated (e.g., by requiring the user to enter user credentials (e.g., a username, password, PIN, etc.)) before being given access to the portal. Users may be, for example, customers/clients and/or resource allocation platform representatives (e.g., customer service).

Upon being authenticated, the user may utilize the portal to perform various cloud management-related operations (also referred to as "control plane" operations). Such operations include, but are not limited to, creating, deploying, allocating, modifying, and/or deallocating (e.g., cloud-based) compute resources; building, managing, monitoring, and/or launching applications (e.g., ranging from simple web applications to complex cloud-based applications); configuring one or more of node(s) (represented as other computing device(s) 102 in FIG. 1) to operate as a particular server (e.g., a database server, OLAP (Online Analytical Processing) server, etc.); etc. Users may use computing device(s) 102 to request allocation of VMs by a resource management service. A management service may allocate compute resources among computing devices to fulfill requests based on available inventory. Examples of compute resources include, but are not limited to, virtual machines, virtual machine scale sets, clusters, ML workspaces, serverless functions, storage disks (e.g., maintained by storage node(s) of server infrastructure represented as computing device(s) 102), web applications, database servers, data objects (e.g., data file(s), table(s), structured data, unstructured data, etc.) stored via the database servers, etc. The portal may be configured in any manner, including being configured with any combination of text entry, for example, via a command line interface (CLI), one or more graphical user interface (GUI) controls, etc., to enable user interaction.

As shown in FIG. 1, computing device(s) 102 may be configured with an untrusted execution environment 104 and a trusted execution environment 106. Untrusted execution environment 104 may perform non-confidential operations on data received in the form of untrusted data (e.g., clear-text data). Trusted execution environment 106 may perform confidential operations on data received in the form of trusted data (e.g., encrypted data).

Trusted execution environment 106 may represent a hardware-based TEE, where data is isolated in one or more CPUs with built-in trusted execution environments during processing, such that data enters and leaves CPU cache (see, e.g., processor 1110 in FIG. 11)) encrypted. Trusted execution environment 106 may perform encryption on data to be stored outside the TEE and decryption on data to be operated on in the TEE. Trusted execution environment 106 may include, for example, a trusted data generator 108, a trusted data validator 110, a trusted timestamp generator 112, and trusted storage 114.

Trusted data generator 108 may generate (e.g., at least in part) trusted data, which is data that is protected from tampering, for example, by encryption. For example, trusted data generator 108 may combine (e.g., concatenate) unprotected data with metadata. The concatenated block of data and metadata may be encrypted, for example, by TEE 106 before leaving TEE 106 for storage, transmission, etc. Encrypted concatenated data may be referred to as an encrypted data object, trusted data, or cipher text.

Metadata may include a storage location of the trusted data, a timestamp (e.g., representing the time the trusted data was generated, encrypted, written, stored, etc.), and, depending on the type of encryption, an integrity value (e.g., calculated based on the data, the data and storage location, or the data, storage location, and a timestamp. For example, an integrity value may not be calculated and concatenated as metadata if authenticated encryption is used to encrypt the concatenated data, e.g., given that authenticated encryption implements data integrity protection. Examples of authenticated encryption include Galois counter mode (GCM).

Trusted data generator 108 may determine the metadata, for example, by (pre) determining a storage location for trusted data (e.g., encrypted data object) and a timestamp to be associated with the stored trusted data. For example, an encrypted data object timestamp may be associated with the encrypted data object and/or a directory or address associated with a storage location of the encrypted data object. Trusted data generator 108 may obtain a timestamp from trusted timestamp generator 112, a storage location indication from trusted execution environment 106, and may generate an integrity value. When integrity value metadata is included in a concatenation, trusted data generator 108 may calculate the integrity value based on, for example, the data, the data and location indication, or the data, the location indication and the timestamp.

Trusted data generator 108 may store the encrypted concatenated data 122 in a storage location indicated by the storage location metadata. As shown by example in FIG. 1, the storage location of encrypted concatenated data 122 may be in untrusted storage 118. Timestamps may be stored in a tree structure, where at least a timestamp of a root of the tree structure is stored in trusted storage 114. A timestamp associated with trusted data may be stored as a non-root timestamp 120 in untrusted storage 118. Non-root timestamp(s) 120 may be protected, for example, by storing a root timestamp 116 in trusted storage 114.

Trusted data validator 110 may validate encrypted concatenated data 122 (e.g., a data object in the form of cipher text), for example, by decrypting encrypted concatenated data (data object) 122 received or retrieved/accessed by computing environment 102 for processing by TEE 106. For example, TEE 106 may retrieve an encrypted concatenated data object 122 from a storage location in (e.g., untrusted storage 118). Trusted data validator 110 may retrieve a first timestamp associated with the retrieved encrypted concatenated data 122 protected by trusted storage 114, which may include accessing non-root timestamp(s) 120 and/or root timestamp 116. TEE 106 may decrypt the encrypted concatenated data object 122, resulting in extraction of data and metadata in unprotected (e.g., clear-text) form, e.g., including a data object, a location indication, a second timestamp, and, depending on the type of encryption, an integrity value, from the decrypted concatenated data object. Trusted data validator may, depending on whether an integrity value was extracted, calculate an integrity value based on the extracted data object (e.g., extracted data, data and location indication, and/or data, location indication, and timestamp) in accordance with the configured integrity calculation.

Trusted data validator 110 may validate or invalidate the extracted data object by: comparing the storage location of the encrypted concatenated data 122 to the location indication extracted from the decrypted data object; comparing the first timestamp to the second timestamp, and, depending on the type of encryption, by comparing an extracted integrity value to a calculated integrity value calculated based on the extracted data, data and location indication, and/or data, location indication, and timestamp in accordance with the configured integrity calculation. Trusted data validator 110 may validate the data object 122, for example, by confirming that the encrypted concatenated data 122 was retrieved from the storage location indicated by the decrypted metadata, by confirming that the protected timestamp associated with the data object is valid compared to the timestamp in the decrypted metadata, and, depending on the type of encryption, by confirming the extracted integrity value matches the calculated integrity value.

The validation of the data object by comparing the first timestamp to the second timestamp may comprise validating the time second timestamp if the second timestamp is not an exact match, e.g., if the second timestamp is equal to or greater than the first timestamp, which may indicate the data is more recent. A security configuration may indicate what results of timestamp comparisons are valid, such as equal, equal to or less than a threshold difference, within a tolerance of dissimilarity, or other acceptable indication of an inexact match to determine timestamp validity.

Trusted timestamp generator 112 may generate timestamps for data to be output by trusted data generator 108. Trusted data generator 108 may acquire a timestamp from trusted timestamp generator 112 for a to-be-protected data object, for example, in response to a data write operation occurring outside TEE 106 (e.g., in untrusted storage 118). The timestamp associated with the data object may be protected for example, by storing at least the root directory timestamp in protected storage (e.g., trusted storage 114). For example, trusted data generator 108 may cause a root timestamp 116 to be stored in trusted storage 114 and a non-root timestamp 120 to be stored in untrusted storage 118, or other timestamp storage arrangement based on a trusted timestamp storage configuration. For example, a timestamp associated with a trusted data object (e.g., encrypted concatenated data object(s) 122) may be stored in and/or associated with a directory in which the trusted data object is stored.

Trusted storage 114 may be used to protect metadata from tampering. For example, timestamps associated with data objects may be protected by storing them, or at least a root directory timestamp in a timestamp tree structure, in trusted storage 114. Trusted data generator 108 may store timestamps in trusted storage 114. Trusted data validator 110 may access stored timestamps (e.g., root timestamp 116) to validate encrypted concatenated data 122.

Figure 2:
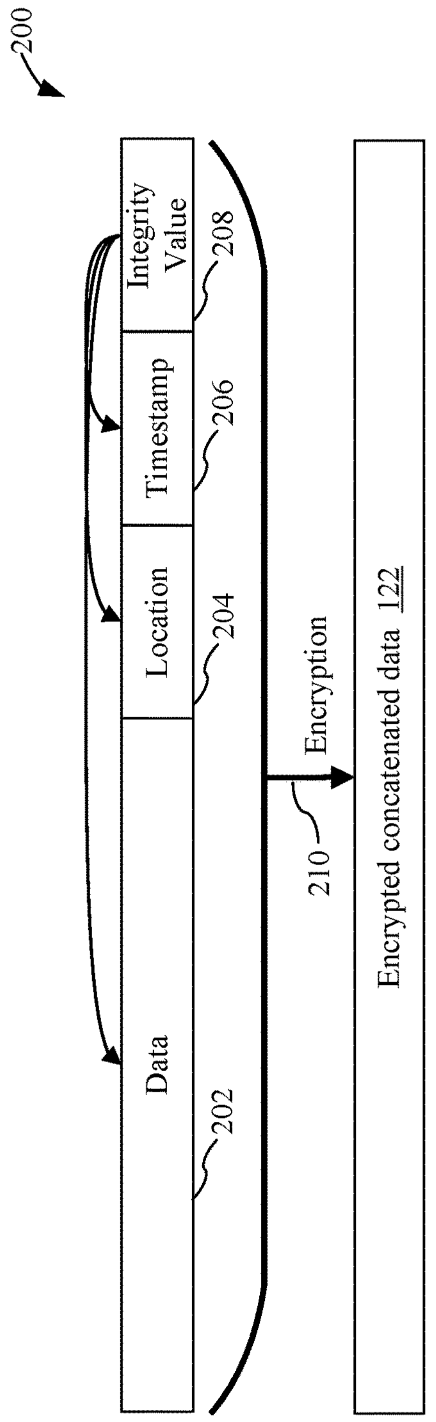
FIG. 2 shows a block diagram of an example of trusted data generation, in accordance with an embodiment.

FIG. 2 shows a block diagram of an example of trusted data generation, in accordance with an embodiment. As shown in FIG. 2, trusted data generator 108 may generate a pre-encryption concatenation 200, comprising clear text data 202 (a data object) and metadata, including location 204 (a location indication), timestamp 206, and an integrity value 208. Concatenation 200 may be encrypted to form encrypted concatenated data 122. Encryption 210 of concatenation 200 may be performed, for example, by trusted data generator 108 and/or by TEE 106.

Data 202 may be unprotected (e.g., clear text) data. Data 202 may be, for example, a block of data selected based on a logical partition, a (pre) determined size, an identifier or container (e.g., a file with a filename).

Location 204 may be an indication of information that may be used to access a data 202, e.g., stored in protected form as encrypted concatenated data 122. Location 204 may be a globally unique identifier (GUID), for example, for an object. Location 204 may be a logical block address, for example, for a disk sector. Location 204 may be public information, e.g., information that is not private. Location 204 may include or may indicate (e.g., the same) information provided to access data 202, such as a storage address provided to a storage system (e.g., untrusted storage 118) in order to access data 202, stored as encrypted concatenated data 122. Location 204 may be concatenated metadata to ensure that the data returned for a read request for instructions executed in TEE 206 is the data for the item requested.

Timestamp 206 may be a time and/or other value in an ever-increasing value that may be used to represent the passage of time. Timestamp 206 may be, for example, a wall-clock time, a sequence number, or other meaningful value within TEE 106. Timestamp 206 may be private data, which may not be exposed to an untrusted/unprotected storage system (e.g., untrusted storage 118). Timestamp 206 may be used to ensure that the data returned for a read request executed in TEE 106 is the data for the specific time or version being requested.

Integrity value 208 may be calculated, as shown by arrows, based on the data 202 alone or in combination with location 204 and/or timestamp 206. Integrity value 208 may be, for example, a cyclic redundancy check (CRC), a hash, or other output generated by a data validation algorithm. For example, an integrity value may be generated using a Secure Hash Algorithm 256-bit (SHA-256) utilized for cryptographic security. Integrity value 208 may be private data, which may not be exposed to an untrusted/unprotected storage system (e.g., untrusted storage 118). Integrity value 208 may be used to ensure that data 202 has not been tampered with in any way.

Figure 3:
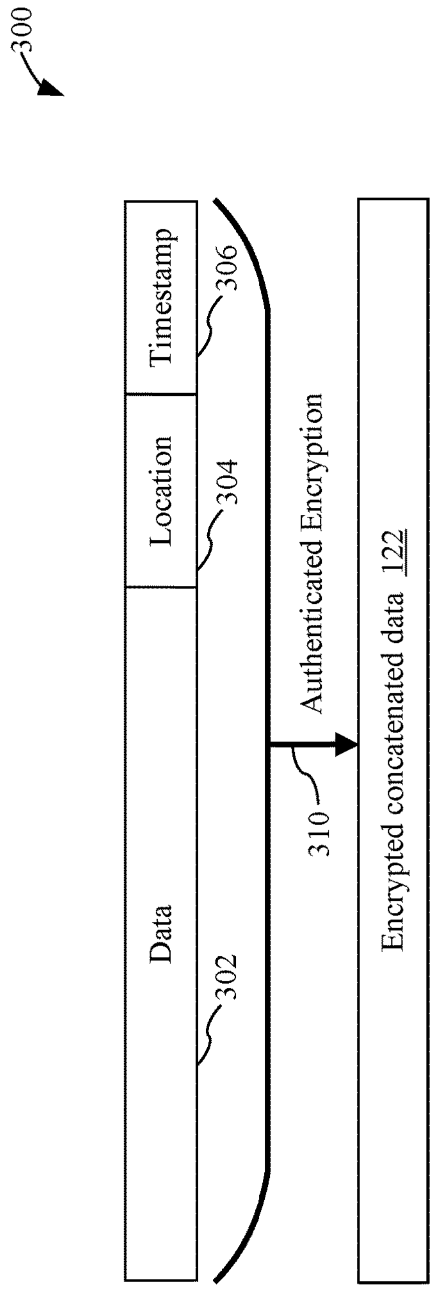
FIG. 3 shows a block diagram of another example of trusted data generation, in accordance with an embodiment.

FIG. 3 shows a block diagram of an example of trusted data generation, in accordance with an embodiment. As shown in FIG. 3, trusted data generator 108 may generate a pre-encryption concatenation 300, comprising clear text data 302 and metadata, including location metadata 304 and timestamp 306. Concatenation 300 may be encrypted to form encrypted concatenated data 122. Encryption 310 of concatenation 300 may be performed, for example, by trusted data generator 108 and/or by TEE 106. Encryption 310 may be, for example, authenticated encryption.

Data 302 may be unprotected (e.g., clear text) data. Data 302 may be, for example, a block of data selected based on a logical partition, a (pre) determined size, an identifier or container (e.g., a file with a filename).

Location 304 may be an indication of information that may be used to access a data 202, e.g., stored in protected form as encrypted concatenated data 122. Location 304 may be a globally unique identifier (GUID), for example, for an object. Location 204 may be a logical block address, for example, for a disk sector. Location 304 may be public information, e.g., information that is not private. Location 304 may include or may indicate (e.g., the same) information provided to access data 302, such as a storage address provided to a storage system (e.g., untrusted storage 118) in order to access data 302, stored as encrypted concatenated data 122. Location 304 may be concatenated metadata to ensure that the data returned for a read request for instructions executed in TEE 206 is the data for the item requested.

Timestamp 306 may be a time and/or other value in an ever-increasing value that may be used to represent the passage of time. Timestamp 306 may be, for example, a wall-clock time, a sequence number, or other meaningful value within TEE 106. Timestamp 306 may be private data, which may not be exposed to an untrusted/unprotected storage system (e.g., untrusted storage 118). Timestamp 306 may be used to ensure that the data returned for a read request executed in TEE 106 is the data for the specific time or version being requested.

Figure 4:
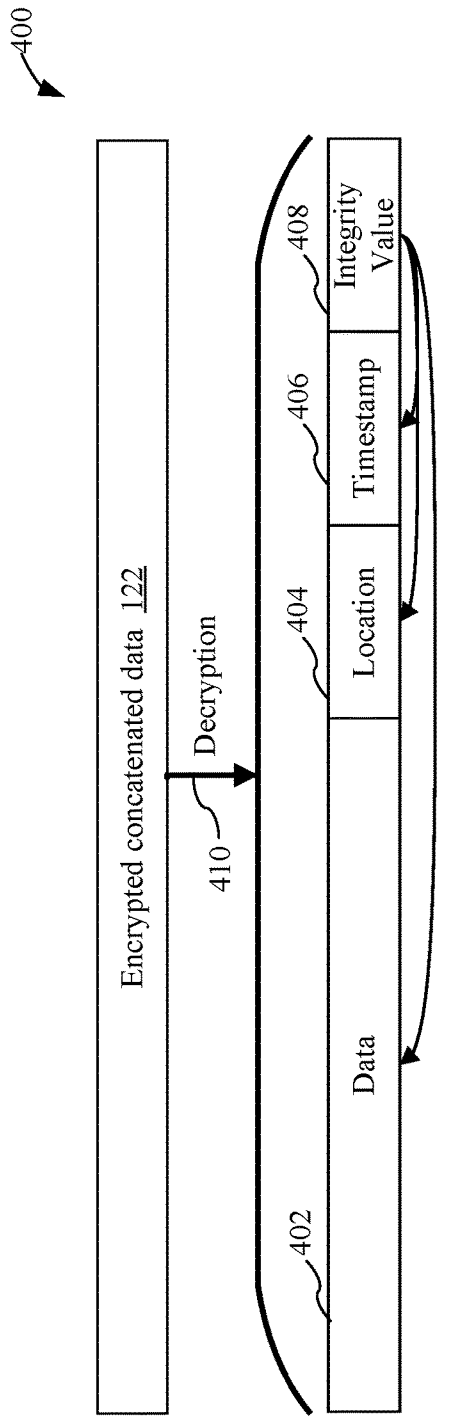
FIG. 4 shows a block diagram of another example of trusted data validation, in accordance with an embodiment.
Figure 5:
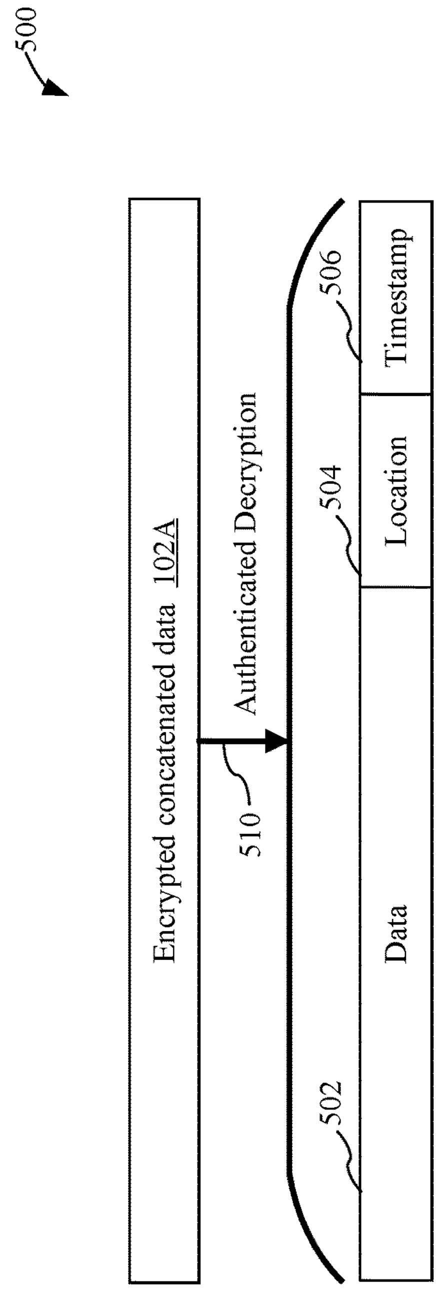
FIG. 5 shows a block diagram of still another example of trusted data validation, in accordance with an embodiment.

As shown in FIGS. 1-3, metadata may be added to data before encryption and storage. The resulting cipher text or trusted data (e.g., encrypted concatenated data 122) is stored in a storage system (e.g., untrusted storage 118). When instructions executed by computing environment 102 call to access and read trusted data, the metadata values extracted by decrypting encrypted concatenated data 122 may be analyzed (e.g., compared to reference values). An integrity metadata value (e.g., if included) may be compared against a value calculated from the data or the data in combination with one or more metadata values. A location metadata value may be compared against information used to retrieve the data. A timestamp metadata value may be compared against a protected timestamp value known to be correct. The data returned for a read request may be invalid and the read request may fail, for example, if one or more metadata values fail to match, e.g., exactly or within a configured tolerance. FIGS. 4 and 5 show examples of decryption.

FIG. 4 shows a block diagram of an example of trusted data validation, in accordance with an embodiment. As shown in FIG. 4, during example validation 400, encrypted concatenated data 122 may be received in response to a read request requested by computing environment 102. Decryption 410 of encrypted concatenated data 122 may be performed, for example, by trusted data validator 110 and/or by TEE 106. Decryption 410 may result in extraction of a pre-encryption concatenation, comprising clear text data 402 and metadata, including location metadata 404, timestamp 406, and an integrity value 408.

Data 402 may be unprotected (e.g., clear text) data. Data 402 may be, for example, a block of data selected based on a logical partition, a (pre) determined size, an identifier or container (e.g., a file with a filename).

Location 404 may be an indication of information that may be used to access data 402, e.g., stored in protected form as encrypted concatenated data 122. Location 404 may be a globally unique identifier (GUID), for example, for an object. Location 404 may be a logical block address, for example, for a disk sector. Location 404 may be public information, e.g., information that is not private. Location 404 may include or may indicate (e.g., the same) information provided to access data 402, such as a storage address provided to a storage system (e.g., untrusted storage 118) in order to access data 402, stored as encrypted concatenated data 122. Trusted data validator 110 may use location 404 to ensure that the data returned for a read request, e.g., encrypted concatenated data 122, is the data for the item requested. Trusted data validator 110 may perform a comparison of location information in an executed read request to location information 404 to determine whether data 402 is valid, at least in terms of location.

Timestamp 406 may be a time and/or other value in an ever-increasing value that may be used to represent the passage of time. Timestamp 406 may be, for example, a wall-clock time, a sequence number, or other meaningful value within TEE 106. Timestamp 406 may be private data, which may not be exposed to an untrusted/unprotected storage system (e.g., untrusted storage 118). Trusted data validator 110 may use timestamp 406 to ensure that the data returned for a read request executed in TEE 106 is the data for the specific time or version being requested. Trusted data validator 110 may access one or more timestamps protected by trusted storage 114. Trusted data validator 110 may perform a comparison of a protected timestamp associated with an executed read request (e.g., non-root timestamp(s) 120 and/or root timestamp 116) to timestamp 406 to determine whether data 402 is valid, at least in terms of timestamp.

Integrity value 208 may be calculated, as shown by arrows, based on the data 202 alone or in combination with location 204 and/or timestamp 206. Integrity value 208 may be, for example, a cyclic redundancy check (CRC), a hash, or other output generated by a data validation algorithm. Integrity value 208 may be private data, which may not be exposed to an untrusted/unprotected storage system (e.g., untrusted storage 118). Trusted data validator 110 may use integrity value 208 to ensure that data 202 has not been tampered with in any way. Trusted data validator 110 may calculate an integrity value based on data 402 alone or in combination with location 404 and/or timestamp 406. Trusted data validator 110 may perform a comparison of the calculated integrity value to integrity value 408 to determine whether data 402 is valid, at least in terms of integrity.

Trusted data validator 110 may determine data 402 to be valid, for example, if location information 404 matches location information in an executed read request, if timestamp 406 matches (e.g., within a configured tolerance) a protected timestamp expected/known for requested encrypted concatenated data 122, and if integrity value 408 matches an integrity value calculated based on data 402 alone or in combination with location 404 and/or timestamp 406 to show that data 402 was not tampered with. Otherwise, if any one of the three compared values do not match, trusted data validator 110 may determine data 402 to be invalid, leading to failure of a read request.

FIG. 5 shows a block diagram of an example of trusted data validation, in accordance with an embodiment. As shown in FIG. 5, during example validation 500, encrypted concatenated data 122 may be received in response to a read request requested by computing environment 102. Decryption 510 of encrypted concatenated data 122 may be performed, for example, by trusted data validator 110 and/or by TEE 106. Decryption 510 may result in extraction of a pre-encryption concatenation, comprising clear text data 502 and metadata, including location metadata 504 and timestamp 506. Decryption 510 may comprise authenticated decryption.

Data 502 may be unprotected (e.g., clear text) data. Data 502 may be, for example, a block of data selected based on a logical partition, a (pre) determined size, an identifier or container (e.g., a file with a filename).

Location 504 may be an indication of information that may be used to access data 502, e.g., stored in protected form as encrypted concatenated data 122. Location 504 may be a globally unique identifier (GUID), for example, for an object. Location 504 may be a logical block address, for example, for a disk sector. Location 504 may be public information, e.g., information that is not private. Location 404 may include or may indicate (e.g., the same) information provided to access data 502, such as a storage address provided to a storage system (e.g., untrusted storage 118) in order to access data 502, stored as encrypted concatenated data 122. Trusted data validator 110 may use location 504 to ensure that the data returned for a read request, e.g., encrypted concatenated data 122, is the data for the item requested. Trusted data validator 110 may perform a comparison of location information in an executed read request to location information 504 to determine whether data 502 is valid, at least in terms of location.

Timestamp 506 may be a time and/or other value in an ever-increasing value that may be used to represent the passage of time. Timestamp 506 may be, for example, a wall-clock time, a sequence number, or other meaningful value within TEE 106. Timestamp 506 may be private data, which may not be exposed to an untrusted/unprotected storage system (e.g., untrusted storage 118). Trusted data validator 110 may use timestamp 506 to ensure that the data returned for a read request executed in TEE 106 is the data for the specific time or version being requested. Trusted data validator 110 may access one or more timestamps protected by trusted storage 114. Trusted data validator 110 may perform a comparison of a protected timestamp associated with an executed read request (e.g., non-root timestamp(s) 120 and/or root timestamp 116) to timestamp 506 to determine whether data 502 is valid, at least in terms of timestamp.

Trusted data validator 110 may determine data 502 to be valid, for example, if location information 504 matches location information in an executed read request, and if timestamp 506 matches (e.g., within a configured tolerance) a protected timestamp expected/known for requested encrypted concatenated data 122. Otherwise, if either of the two compared values do not match, trusted data validator 110 may determine data 502 to be invalid, leading to failure of a read request.

An extracted/recovered timestamp metadata value may be compared without calculation to a known, private (e.g., protected) timestamp value. Validation of a timestamp may rest on knowledge of what the timestamp should be for the data it is associated with. Known timestamp information may (e.g., must) be kept private, for example, using a timestamp generation and/or storage system (e.g., trusted timestamp generator 112, trusted storage 114).

A timestamp storage system for tracking timestamps may be implemented with trusted communication links that can be established between trusted compute environments. Trusted compute nodes may use trusted links to work together to provide a metadata (e.g., timestamp) trusted storage system. For example, a consensus protocol, such as Paxos or Raft, may be established/implemented among compute nodes (e.g., computing devices 102) in a secure manner. Timestamps for trusted data may be securely stored according to the consensus protocol.

Data can be stored in an untrusted storage system (e.g., untrusted storage 118), for example, using an RSL ring. Timestamps used as metadata in trusted data may be protected by a trusted storage system (e.g., trusted storage 114), which may be maintained by trusted compute nodes in an RSL ring. In an example, a new node may be instructed to retrieve or recover data. A node may access a binary large object (BLOB) based on a known GUID. The node can validate the location (e.g., GUID) and integrity value (e.g. cyclic redundancy check (CRC)) based on information the node has in decrypted concatenated data and metadata. The timestamp metadata in the decrypted concatenation may be validated against a timestamp value provided to the node by other nodes in the RSL ring. If the three metadata values match (e.g., within configured tolerance(s)), the node may "know" the data in the BLOB is valid so that the node can trust the data it received and act on it.

In some examples, there could be one (e.g., large) ring that stores all timestamps, although a single ring may not scale well. In some examples, address space may be partitioned into a tree structure, e.g., similar to a file system directory. A tree structure may allow multiple (e.g., many) RSL rings to operate independently of each other. Each RSL ring may store data in untrusted storage 118. Each ring can record the timestamp in the directory above where the data is stored, for example, when data is stored, e.g., in untrusted storage 118. This process may continue back to the root directory with a root timestamp. In some examples, protection of timestamps (e.g., non-root timestamp(s) 120) may be provided by storing only the root timestamp 116 in trusted storage 114.

Figure 6:
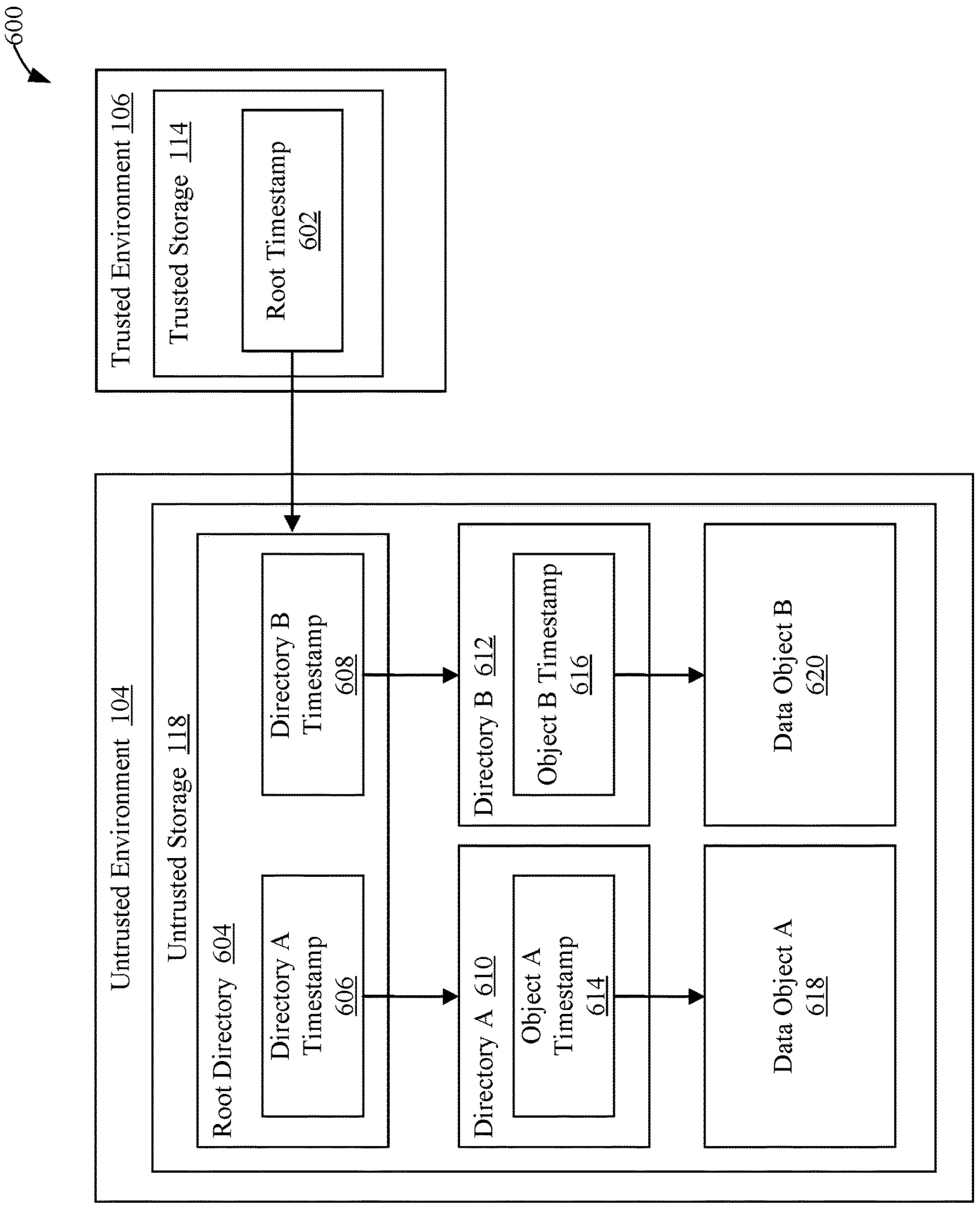
FIG. 6 shows an example of a tree structure of timestamps, in accordance with an embodiment.

FIG. 6 shows an example of a tree structure of timestamps, in accordance with an embodiment. As shown by example tree structure 600, a root timestamp 602 for a root directory 604 is stored in trusted storage 114 while other (e.g., non-root) timestamps are stored in untrusted storage 118. Timestamps for directories and data objects may be stored in the directory above. For example, in untrusted storage 118, Object A timestamp 614 for trusted data object A 618 is stored in directory A 610. Object B timestamp 616 for trusted data object B 620 is stored in directory B 612. Directory A timestamp 606 for directory A 610 is stored in root directory 604. Directory B timestamp 608 for directory B 612 is stored in root directory 604. Root timestamp 602 for root directory 604 is stored in trusted storage 114.

In some examples, a current time may be a root time. In some examples, such as where non-root timestamps are stored in untrusted storage 118, timestamps may be protected by storing at least a root timestamp in trusted storage 114 to guarantee data has not been manipulated, e.g., by a replay attack. An RSL ring may provide a guarantee to detect and prevent tampering if the systems involved in the RSL ring are running. If all nodes in an RSL ring were restarted simultaneously, the root timestamp may be lost. In the absence of other trusted storage, the current time may be used to detect the situation of restarting all RSL ring nodes simultaneously.

Audit records may detect offline compute nodes. For example, a trusted component storing a root timestamp may periodically (e.g., in intervals) or continually write/store audit records. A comparison of the most recent record to the current time may be used to detect if the trusted component has been offline. The attack vector for a system may be to move the system clock backward in time. A trusted clock incorporated/built into the trusted compute environment (e.g., trusted timestamp generator 112) may eliminate such an attack vector.

Creating a tree of timestamps may be similar to creating a Merkle tree. A timestamp tree may provide the same or similar level of protection as a Merkle tree, e.g., storing at least the root timestamp value securely. Timestamps may be protected from tampering using encryption, which may already be in use for storage in a confidential computing environment, such as TEE 106. Timestamps may provide numerous advantages compared to a Merkle tree.

Timestamps may be implemented without computations (e.g., hashing). Timestamps are a value stored with data for subsequent comparison without calculations. Storing and comparing timestamps does not require computations. The integrity of the data protected by timestamps may be handled on a per item basis. Encryption itself protects against tampering.

Timestamps may be sequential in nature. Timestamps may (e.g., always) increase. Validation of a timestamp may be performed differently depending on configuration. For example, a request may be made for the latest version of data. A timestamp associated with (e.g., recovered from) the data may be compared to a known trusted timestamp to determine whether the timestamp is "greater than or equal to" rather than just "equal to" the known trusted timestamp. Furthermore, timestamps have the advantage of not needing to be updated if a particular change does not need to be protected against a replay attack.

Timestamps offer flexibility. The ability to use different types of timestamps and use different types of comparisons creates opportunities for optimizing the system with a configuration based on specific needs. For example, wall-clock time may be used to generate timestamps. One or more timestamp comparison tolerances or thresholds may be specified (e.g., a difference of plus and/or minus an amount of time) to validate timestamps associated with data. In an example, a system may checkpoint every five seconds. A timestamp that is five (5) seconds old may be considered valid because, although an attacker could replay old data, only old data from five (5) seconds ago could be replayed under such a validity determination based on a difference of up to five (5) seconds. This is one of many possible examples where differences within tolerances may confirm validity of timestamps and associated data.

In an example, there may be a trusted environment where code is executing on confidential data. There may be a very small amount of trusted storage (e.g., often memory only and not storage). A customer may use different encryption keys for different chunks of data with keys stored in an encryption key BLOB, which may be encrypted with another key that has to be typed in by a person and is not stored anywhere. A customer may bootstrap by connecting to a machine, typing in an authentication key to unlock everything, then the system starts up. This is an example of a way to encrypt many keys (e.g., 100,000 keys) that could be stored in untrusted data. Protection of timestamps in a tree structure may be similar. For example, one timestamp may be used to vouch for a group of timestamps, each of which may vouch for another group of timestamps, eventually getting to a root timestamp, which may be the only timestamp in trusted storage.

Updates to trusted data may impact the trusted data. For example, if one timestamp is stored per trusted data block, then for each update the timestamp metadata may be updated and protected by (e.g., stored in) trusted storage for validation by comparison. Data (e.g., a file) may span multiple trusted data blocks, each with a different timestamp. For example, block A and block B may each have timestamps updated for edits/changes. Voluminous data with many blocks of trusted data may consume significant storage to maintain trusted/protected timestamps. In an example, each BLOB of trusted data (e.g., cypher text) may consume a sector of a disk, so that each chunk of data is 4 kB in a 4 TB volume, which could be 1 million trusted data chunks and 1 million timestamps in trusted storage. The 1 million timestamps could be stored in untrusted storage similar to a Merkle tree. The blocks could be broken into sections with timestamps in groups similar to a Merkle tree. For example, there may be one timestamp associated with each 1000 sectors. Only the root timestamp may be protected in a trusted environment. In an embodiment, one update may be made at each level of the Merkel tree back to the root when a single block is updated. With timestamps and allowable time delta tolerances, these updates could be batched for improved performance. Timestamps for objects may be stored in any suitable manner. In one example, a hash map may be used to store timestamps, with the key to the hash table being the Object Identifier and the value being the corresponding timestamp.

In some examples, a configuration (e.g., of computing environment 100) may require that (e.g., all) updates be committed before read/write request success/validity is declared. This configuration may be equivalent to updating the full path to the root of a Merkle tree on every write. While this configuration could provide the highest level of security, it may also incur a high performance cost.

A timestamp system offers versatility, adaptability, and customization. In contrast to the lack of versatility offered by a Merkle Tree, a timestamp system may apply different policies/configurations for different customers based on their needs, for example, based on an ability to reason about timestamps both forwards and backwards. In some examples, a cloud provider may provide a timestamp service for customers who run timestamp validation in their trusted environments (e.g., TEEs).

Various implementations may trade off performance and parallelism with absolute security. For example, while a bad actor might be able to do a replay attack in a certain window of time, it may be a very limited opportunity with a very low probability of occurrence and very low risk if it does occur, which may allow some customers to optimize configurations for performance.

In an example, a configuration may allow a customer to select a safeguard, such as a window of no more than a threshold number of seconds (e.g., five seconds) combined with always waiting the threshold number of seconds to verify the data. The data may be assumed to be correct, but may be double checked after a data update to make sure that the timestamp stored for validate did get updated to match the timestamp stored with the data. Another type of (e.g., configurable) protection may be to limit/restrict updates, e.g., do not update data more than n times during the threshold window. Flexibility in allowing adjustments for comparison may range from requiring a recovered timestamp to match exactly to a protected expected timestamp, providing full protection similar to a Merkle tree (e.g., as far as performing updates on everything and basically being synchronous) to relaxing comparisons to equal to or greater than (e.g., newer data) with a controlled/limited attack window, e.g., with an acceptably low probability of occurrence and/or low potential damage.

Timestamps (e.g., clock time, sequence numbers) combined with confidential computing offer additional protection against data manipulation/tampering, such as replay attacks and other types of data substitution, for data stored in untrusted storage. Timestamps may be private, or at least protected, for example, as described herein.

A timestamp (e.g., indicating the time that the data was written) used as metadata and protected in a trusted store play a role in determining data validity. Retrieved data (e.g., a BLOB) may be validated by confirmation of location, integrity (e.g., CRC), and timestamp metadata in the BLOB compared to the retrieved location, calculated integrity value and the protected timestamp indicating when the BLOB was supposed to have been written. A replay attack would be detected and prevented because the protected timestamp indicates, for example, that the BLOB was written at 1257 while a timestamp in the BLOB may indicate 1255, e.g., old data.

Figure 7:
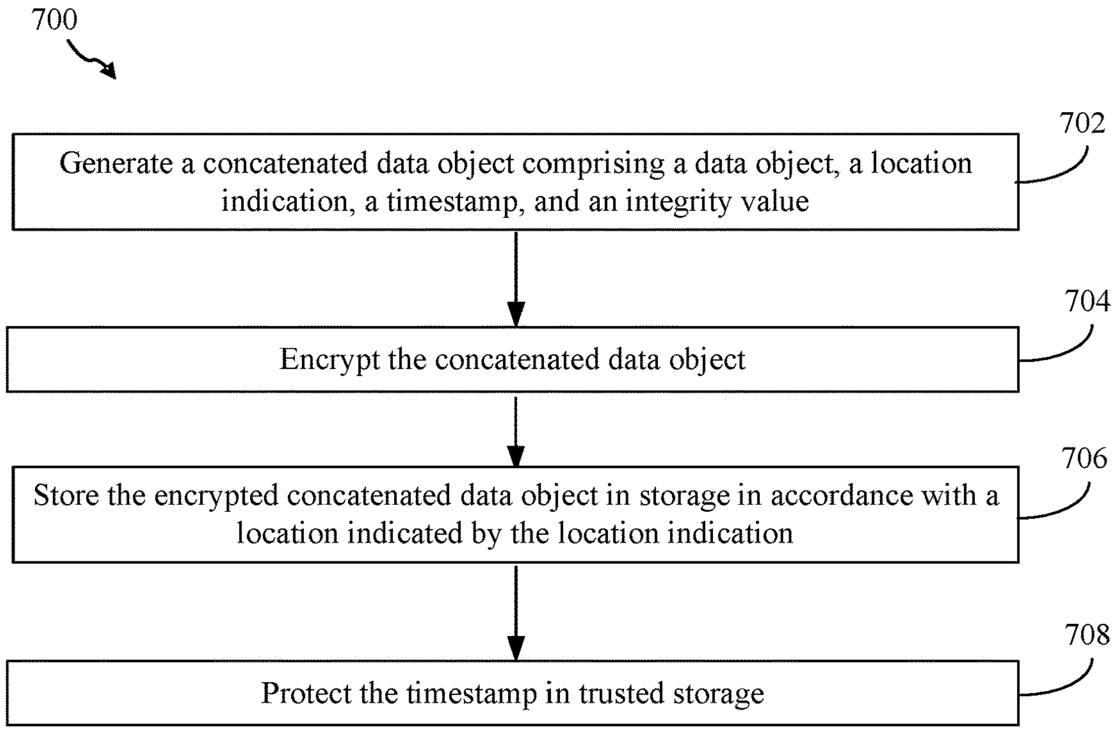
FIG. 7 shows a flowchart of a process for generating trusted data, in accordance with an embodiment.

FIG. 7 shows flowchart 700 of an example process for generating trusted data, in accordance with an embodiment. Computing device(s) 102 or a portion thereof, such as TEE 106, shown in FIG. 1 may operate according to flowchart 700, for example, in one or more embodiments. Note that not all steps of flowchart 700 need be performed in all embodiments. Further structural and operational embodiments will be apparent to persons skilled in the relevant art(s) based on the following description.

Flowchart 700 begins with step 702. In step 702, a concatenated data object may be generated. The concatenated data object may comprise a data object, a location indication, a timestamp, and an integrity value. For example, as shown in FIG. 1, trusted data generator 108 may, as shown in FIG. 2, concatenate data 202, location information 204, timestamp 206, and integrity value 208.

In step 704, the data object may be encrypted. For example, as shown in FIG. 1. TEE 106 or a component thereof, e.g., trusted data generator 108, may, as shown in FIG. 2, perform encryption 210 on the concatenated data object to generate encrypted concatenated data 122.

In step 706, the encrypted concatenated data object may be stored in (e.g., untrusted) storage in accordance with a location indicated by the location indication. For example, as shown in FIG. 1, TEE 106 or a component thereof, e.g., trusted data generator 108, may store encrypted concatenated data 122 in untrusted storage 118.

In step 708, the timestamp may be protected in trusted storage (e.g., by protecting the root timestamp). For example, as shown in FIG. 1, TEE 106 or a component thereof, e.g., trusted data generator 108, may store non-root timestamp(s) 120 or at least root timestamp 116 in trusted storage 114 for subsequent validation of encrypted concatenated data 122.

Figure 8:
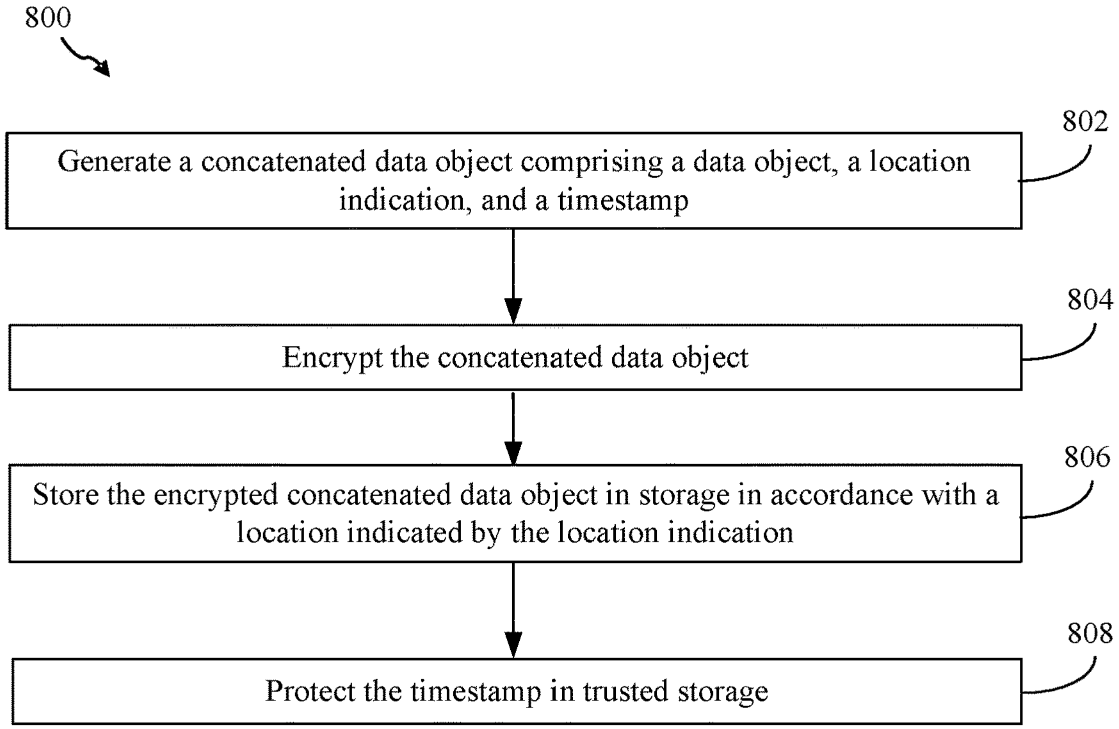
FIG. 8 shows a flowchart of another process for generating trusted data, in accordance with an embodiment.

FIG. 8 shows flowchart 800 of an example process for generating trusted data, in accordance with an embodiment. Computing device(s) 102 or a portion thereof, such as TEE 106, shown in FIG. 1 may operate according to flowchart 800, for example, in one or more embodiments. Note that not all steps of flowchart 800 need be performed in all embodiments. Further structural and operational embodiments will be apparent to persons skilled in the relevant art(s) based on the following description.

Flowchart 800 begins with step 802. In step 802, a concatenated data object may be generated. The concatenated data object may comprise a data object, a location indication, and a timestamp. For example, as shown in FIG. 1, trusted data generator 108 may, as shown in FIG. 3, concatenate data 302, location information 304, and timestamp 306.

In step 804, the data object may be encrypted. For example, as shown in FIG. 1, TEE 106 or a component thereof, e.g., trusted data generator 108, may, as shown in FIG. 3, perform encryption 310 on the concatenated data object to generate encrypted concatenated data 122, e.g., using authenticated encryption.

In step 806, the encrypted concatenated data object may be stored in (e.g., untrusted) storage in accordance with a location indicated by the location indication. For example, as shown in FIG. 1. TEE 106 or a component thereof, e.g., trusted data generator 108, may store encrypted concatenated data 122 in untrusted storage 118.

In step 808, the timestamp may be protected in trusted storage (e.g., by protecting the root timestamp). For example, as shown in FIG. 1. TEE 106 or a component thereof, e.g., trusted data generator 108, may store non-root timestamp(s) 120 or at least root timestamp 116 in trusted storage 114 for subsequent validation of encrypted concatenated data 122.

Figure 9:
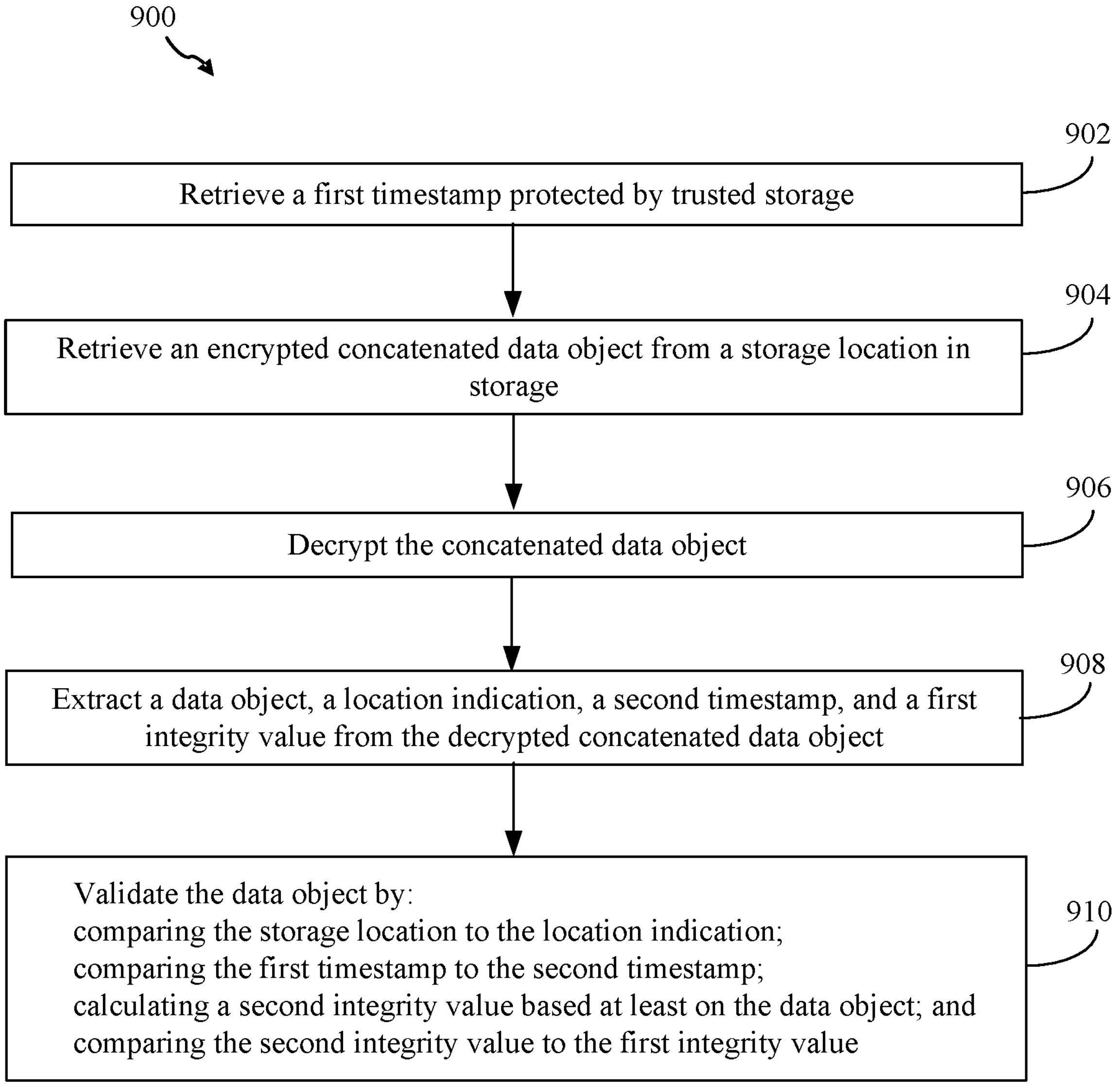
FIG. 9 shows a flowchart of a process for validating trusted data, in accordance with an embodiment.

FIG. 9 shows flowchart 900 of an example process for validating trusted data, in accordance with an embodiment. Computing device(s) 102 or a portion thereof, such as TEE 106, shown in FIG. 1 may operate according to flowchart 900, for example, in one or more embodiments. Note that not all steps of flowchart 900 need be performed in all embodiments. Further structural and operational embodiments will be apparent to persons skilled in the relevant art(s) based on the following description.

Flowchart 900 begins with step 902. In step 902, a first timestamp is retrieved. The timestamp may be protected by trusted storage. For example, as shown in FIG. 1, trusted data validator 110 may retrieve/receive non-root timestamp 120 and/or root timestamp 116, e.g., in association with a read request.

In step 904, an encrypted concatenated data object may be retrieved from a storage location in storage. For example, as shown in FIG. 1, trusted data validator 110 may retrieve/receive encrypted concatenated data 122 from untrusted storage 118, e.g., in association with a read request.

In step 906, the encrypted concatenated data object may be decrypted. For example, as shown in FIG. 1. TEE 106 or a component thereof, e.g., trusted data validator 110, may, as shown in FIG. 4, perform decryption 410 on the concatenated data object 122 to generate decrypted concatenated data.

In step 908, a data object, a location indication, a second timestamp, and a first integrity value may be extracted from the decrypted concatenated data object. For example, as shown in FIG. 1, trusted data validator 110 may, as shown in FIG. 4, extract data 402, location information 404, timestamp 406, and integrity value 408.

In step 910, the data object may be validated by: comparing the storage location to the location indication; comparing the first timestamp to the second timestamp; calculating a second integrity value based at least on the data object; and comparing the second integrity value to the first integrity value. For example, as shown in FIG. 1, trusted data validator 110 may, as shown in FIG. 4, validate data object 402 by: comparing the storage location of encrypted concatenated data 122 to extracted location indication 404; comparing non-root timestamp 120 and/or root timestamp 116 to extracted timestamp 406; calculating an integrity value based at least on the data object (e.g., as shown by arrows) using a predefined integrity calculation algorithm (e.g., SHA-256); and comparing the calculated integrity value to extracted integrity value 408. Data 402 may be validated, for example, if the three comparisons match, e.g., within configured tolerance(s).

Figure 10:
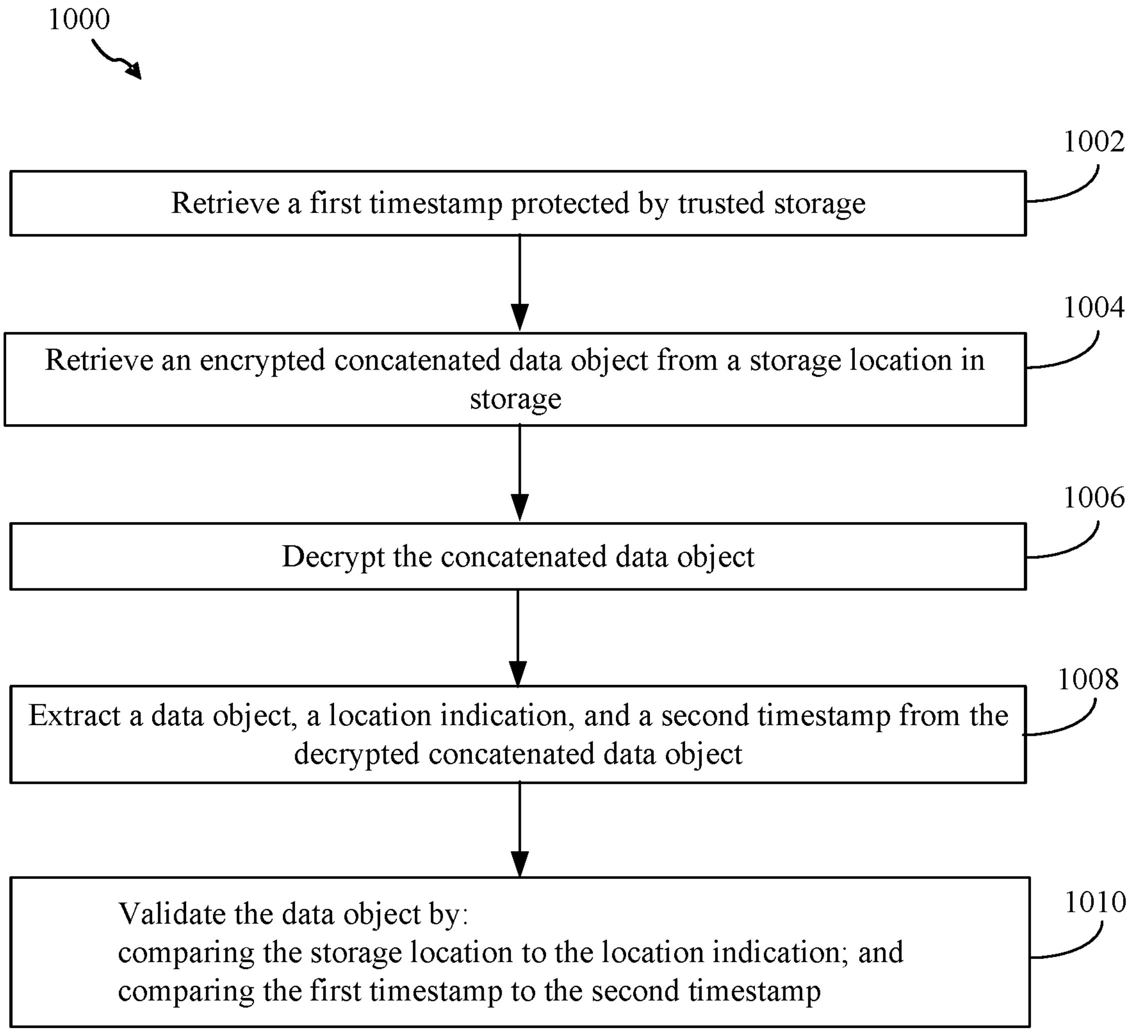
FIG. 10 shows a flowchart of another process for validating trusted data, in accordance with an embodiment.

FIG. 10 shows flowchart 1000 of an example process for validating trusted data, in accordance with an embodiment. Computing device(s) 102 or a portion thereof, such as TEE 106, shown in FIG. 1 may operate according to flowchart 1000, for example, in one or more embodiments. Note that not all steps of flowchart 1000 need be performed in all embodiments. Further structural and operational embodiments will be apparent to persons skilled in the relevant art(s) based on the following description.

Flowchart 1000 begins with step 1002. In step 1002, a first timestamp is retrieved. The timestamp may be protected by trusted storage. For example, as shown in FIG. 1, trusted data validator 110 may retrieve/receive non-root timestamp 120 and/or root timestamp 116, e.g., in association with a read request.

In step 1004, an encrypted concatenated data object may be retrieved from a storage location in storage. For example, as shown in FIG. 1, trusted data validator 110 may retrieve/receive encrypted concatenated data 122 from untrusted storage 118, e.g., in association with a read request.

In step 1006, the encrypted concatenated data object may be decrypted. For example, as shown in FIG. 1. TEE 106 or a component thereof, e.g., trusted data validator 110, may, as shown in FIG. 5, perform decryption 510 on concatenated data object 122 to generate decrypted concatenated data, e.g., using authenticated decryption.

In step 1008, a data object, a location indication, and a second timestamp may be extracted from the decrypted concatenated data object. For example, as shown in FIG. 1, trusted data validator 110 may, as shown in FIG. 5, extract data 502, location information 504, and timestamp 506.

In step 1010, the data object may be validated by: comparing the storage location to the location indication; and comparing the first timestamp to the second timestamp. For example, as shown in FIG. 1, trusted data validator 110 may, as shown in FIG. 5, validate data object 502 by: comparing the storage location of encrypted concatenated data 122 to extracted location indication 504; and comparing non-root timestamp 120 and/or root timestamp 116 to extracted timestamp 506. Data 502 may be validated, for example, if the two comparisons match, e.g., within configured tolerance(s).

III. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 11:
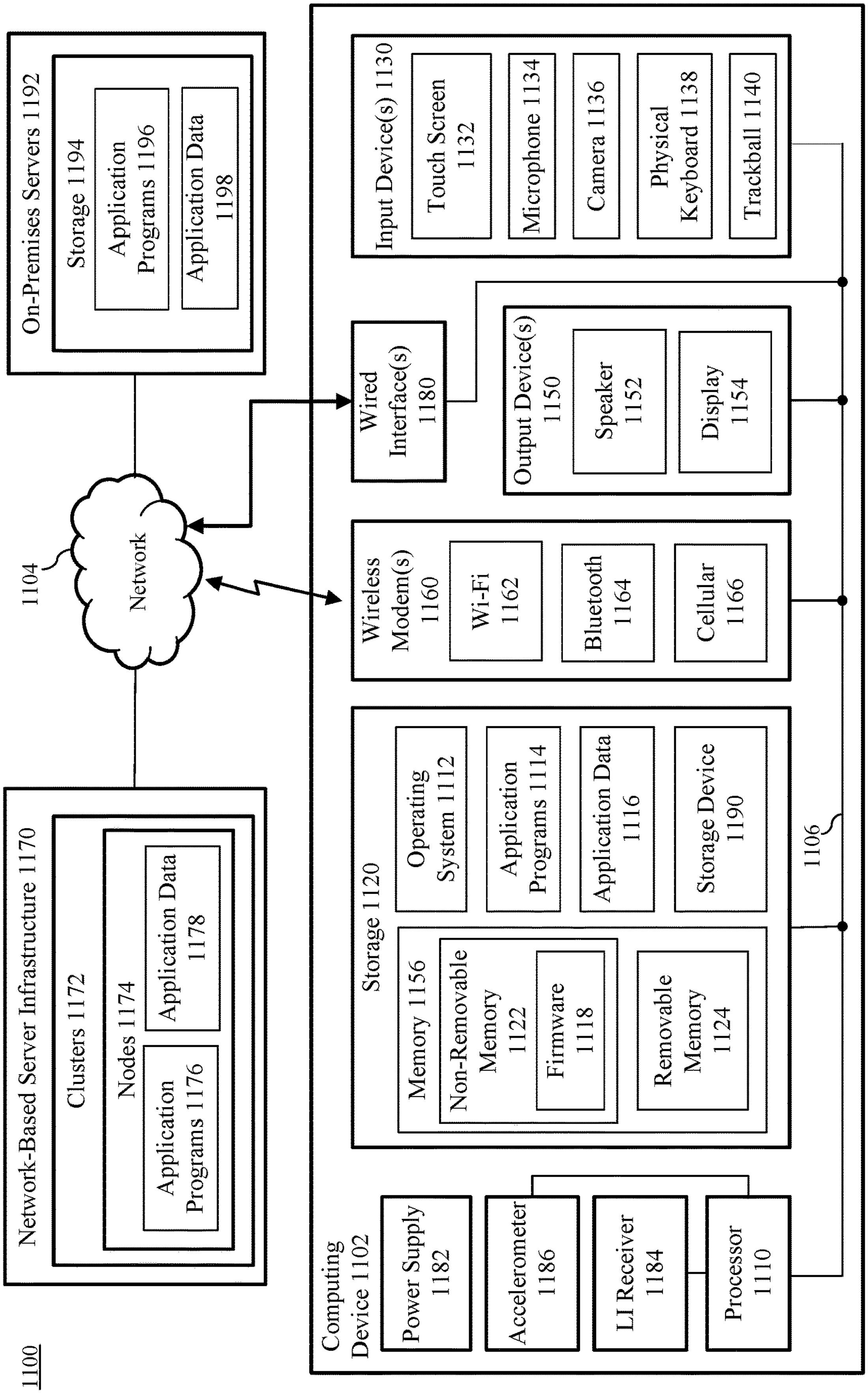
FIG. 11 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 11. FIG. 11 shows a block diagram of an exemplary computing environment 1100 that includes a computing device 1102. Computing device 1102 is an example of computing device 102A-102N, node 116A-N, node 118A-N, and/or another computing device of server infrastructure 104 as described with respect to FIG. 1, each of which may include one or more of the components of computing device 1102. In some embodiments, computing device 1102 is communicatively coupled with devices (not shown in FIG. 11) external to computing environment 1100 via network 1004. Network 1104 is an example of network 106 of FIG. 1. Network 1104 comprises one or more networks such as local area networks (LANs), wide area networks (WANs), enterprise networks, the Internet, etc., and may include one or more wired and/or wireless portions. Network 1104 may additionally or alternatively include a cellular network for cellular communications. Computing device 1002 is described in detail as follows.

Computing device 1102 can be any of a variety of types of computing devices. For example, computing device 1102 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 1102 may alternatively be a stationary computing device such as a desktop computer, a personal computer (PC), a stationary server device, a minicomputer, a mainframe, a supercomputer, etc.

As shown in FIG. 11, computing device 1102 includes a variety of hardware and software components, including a processor 1110, a storage 1120, one or more input devices 1130, one or more output devices 1150, one or more wireless modems 1160, one or more wired interfaces 1180, a power supply 1182, a location information (LI) receiver 1184, and an accelerometer 1186. Storage 1120 includes memory 1156, which includes non-removable memory 1122 and removable memory 1124, and a storage device 1190. Storage 1120 also stores an operating system 1112, application programs 1114, and application data 1116. Wireless modem(s) 1160 include a Wi-Fi modem 1162, a Bluetooth modem 1164, and a cellular modem 1166. Output device(s) 1150 includes a speaker 1152 and a display 1154. Input device(s) 1130 includes a touch screen 1132, a microphone 1134, a camera 1136, a physical keyboard 1138, and a trackball 1140. Not all components of computing device 1102 shown in FIG. 11 are present in all embodiments, additional components not shown may be present, and any combination of the components may be present in a particular embodiment. These components of computing device 1102 are described as follows.

A single processor 1110 (e.g., central processing unit (CPU), microcontroller, a microprocessor, signal processor, ASIC (application specific integrated circuit), and/or other physical hardware processor circuit) or multiple processors 1110 may be present in computing device 1102 for performing such tasks as program execution, signal coding, data processing, input/output processing, power control, and/or other functions. Processor 1110 may be a single-core or multi-core processor, and each processor core may be single-threaded or multithreaded (to provide multiple threads of execution concurrently). Processor 1110 is configured to execute program code stored in a computer readable medium, such as program code of operating system 1112 and application programs 1114 stored in storage 1120. Operating system 1112 controls the allocation and usage of the components of computing device 1102 and provides support for one or more application programs 1114 (also referred to as "applications" or "apps"). Application programs 1114 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 1102 can communicate with any other component according to function, although not all connections are shown for ease of illustration. For instance, as shown in FIG. 11, bus 1106 is a multiple signal line communication medium (e.g., conductive traces in silicon, metal traces along a motherboard, wires, etc.) that may be present to communicatively couple processor 1110 to various other components of computing device 1102, although in other embodiments, an alternative bus, further buses, and/or one or more individual signal lines may be present to communicatively couple components. Bus 1106 represents one or more of any of several types of bus structures, including a memory bus or memory controller, a peripheral bus, an accelerated graphics port, and a processor or local bus using any of a variety of bus architectures.

Storage 1120 is physical storage that includes one or both of memory 1156 and storage device 1190, which store operating system 1112, application programs 1114, and application data 1116 according to any distribution. Non-removable memory 1122 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 1122 may include main memory and may be separate from or fabricated in a same integrated circuit as processor 1110. As shown in FIG. 11, non-removable memory 1122 stores firmware 1118, which may be present to provide low-level control of hardware. Examples of firmware 1118 include BIOS (Basic Input/Output System, such as on personal computers) and boot firmware (e.g., on smart phones). Removable memory 1124 may be inserted into a receptacle of or otherwise coupled to computing device 1102 and can be removed by a user from computing device 1102. Removable memory 1124 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 1190 may be present that are internal and/or external to a housing of computing device 1102 and may or may not be removable. Examples of storage device 1190 include a hard disk drive, a SSD, a thumb drive (e.g., a USB (Universal Serial Bus) flash drive), or other physical storage device.

One or more programs may be stored in storage 1120. Such programs include operating system 1112, one or more application programs 1114, and other program modules and program data. Examples of such application programs may include, for example, computer program logic (e.g., computer program code/instructions) for implementing one or more of trusted data generator 108, trusted data validator 110, and trusted timestamp generator 112, along with any components and/or subcomponents thereof, as well as the flowcharts/flow diagrams (e.g., flowcharts 700, 800, 900, and/or 1000) described herein, including portions thereof, and/or further examples described herein.

Storage 1120 also stores data used and/or generated by operating system 1112 and application programs 1114 as application data 1116. Examples of application data 1116 include web pages, text, images, tables, sound files, video data, and other data, which may also be sent to and/or received from one or more network servers or other devices via one or more wired or wireless networks. Storage 1120 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 1102 through one or more input devices 1130 and may receive information from computing device 1102 through one or more output devices 1150. Input device(s) 1130 may include one or more of touch screen 1132, microphone 1134, camera 1136, physical keyboard 1138 and/or trackball 1140 and output device(s) 1150 may include one or more of speaker 1152 and display 1154. Each of input device(s) 1130 and output device(s) 1150 may be integral to computing device 1102 (e.g., built into a housing of computing device 1102) or external to computing device 1102 (e.g., communicatively coupled wired or wirelessly to computing device 1102 via wired interface(s) 1180 and/or wireless modem(s) 1160). Further input devices 1130 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1154 may display information, as well as operating as touch screen 1132 by receiving user commands and/or other information (e.g., by touch, finger gestures, virtual keyboard, etc.) as a user interface. Any number of each type of input device(s) 1130 and output device(s) 1150 may be present, including multiple microphones 1134, multiple cameras 1136, multiple speakers 1152, and/or multiple displays 1154.

One or more wireless modems 1160 can be coupled to antenna(s) (not shown) of computing device 1102 and can support two-way communications between processor 1110 and devices external to computing device 1102 through network 1104, as would be understood to persons skilled in the relevant art(s). Wireless modem 1160 is shown generically and can include a cellular modem 1166 for communicating with one or more cellular networks, such as a GSM network for data and voice communications within a single cellular network, between cellular networks, or between the mobile device and a public switched telephone network (PSTN). Wireless modem 1160 may also or alternatively include other radio-based modem types, such as a Bluetooth modem 1164 (also referred to as a "Bluetooth device") and/or Wi-Fi 1162 modem (also referred to as an "wireless adaptor"). Wi-Fi modem 1162 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1164 is configured to communicate with another Bluetooth-capable device according to the Bluetooth short-range wireless technology standard(s) such as IEEE 802.15.1 and/or managed by the Bluetooth Special Interest Group (SIG).

Computing device 1102 can further include power supply 1182, LI receiver 1184, accelerometer 1186, and/or one or more wired interfaces 1180. Example wired interfaces 1180 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 1180 of computing device 1102 provide for wired connections between computing device 1102 and network 1104, or between computing device 1102 and one or more devices/peripherals when such devices/peripherals are external to computing device 1102 (e.g., a pointing device, display 1154, speaker 1152, camera 1136, physical keyboard 1138, etc.). Power supply 1182 is configured to supply power to each of the components of computing device 1102 and may receive power from a battery internal to computing device 1102, and/or from a power cord plugged into a power port of computing device 1102 (e.g., a USB port, an A/C power port). LI receiver 1184 may be used for location determination of computing device 1102 and may include a satellite navigation receiver such as a Global Positioning System (GPS) receiver or may include other type of location determiner configured to determine location of computing device 1102 based on received information (e.g., using cell tower triangulation, etc.). Accelerometer 1186 may be present to determine an orientation of computing device 1102.

Note that the illustrated components of computing device 1102 are not required or all-inclusive, and fewer or greater numbers of components may be present as would be recognized by one skilled in the art. For example, computing device 1102 may also include one or more of a gyroscope, barometer, proximity sensor, ambient light sensor, digital compass, etc. Processor 1110 and memory 1156 may be co-located in a same semiconductor device package, such as being included together in an integrated circuit chip, FPGA, or system-on-chip (SOC), optionally along with further components of computing device 1102.

In embodiments, computing device 1102 is configured to implement any of the above-described features of flowcharts herein. Computer program logic for performing any of the operations, steps, and/or functions described herein may be stored in storage 1120 and executed by processor 1110.

In some embodiments, server infrastructure 1170 may be present in computing environment 1100 and may be communicatively coupled with computing device 1102 via network 1104. Server infrastructure 1170, when present, may be a network-accessible server set (e.g., a cloud-based environment or platform). As shown in FIG. 11, server infrastructure 1170 includes clusters 1172. Each of clusters 1172 may comprise a group of one or more compute nodes and/or a group of one or more storage nodes. For example, as shown in FIG. 11, cluster 1172 includes nodes 1174. Each of nodes 1174 are accessible via network 1104 (e.g., in a "cloud-based" embodiment) to build, deploy, and manage applications and services. Any of nodes 1174 may be a storage node that comprises a plurality of physical storage disks, SSDs, and/or other physical storage devices that are accessible via network 1104 and are configured to store data associated with the applications and services managed by nodes 1174. For example, as shown in FIG. 11, nodes 1174 may store application data 1178.

Each of nodes 1174 may, as a compute node, comprise one or more server computers, server systems, and/or computing devices. For instance, a node 1174 may include one or more of the components of computing device 1102 disclosed herein. Each of nodes 1174 may be configured to execute one or more software applications (or "applications") and/or services and/or manage hardware resources (e.g., processors, memory, etc.), which may be utilized by users (e.g., customers) of the network-accessible server set. For example, as shown in FIG. 11, nodes 1174 may operate application programs 1176. In an implementation, a node of nodes 1174 may operate or comprise one or more virtual machines, with each virtual machine emulating a system architecture (e.g., an operating system), in an isolated manner, upon which applications such as application programs 1176 may be executed.

In an embodiment, one or more of clusters 1172 may be co-located (e.g., housed in one or more nearby buildings with associated components such as backup power supplies, redundant data communications, environmental controls, etc.) to form a data center, or may be arranged in other manners. Accordingly, in an embodiment, one or more of clusters 1172 may be a data center in a distributed collection of data centers. In embodiments, exemplary computing environment 1100 comprises part of a cloud-based platform such as Amazon Web Services® of Amazon Web Services, Inc., or Google Cloud Platform™ of Google LLC, although these are only examples and are not intended to be limiting.

In an embodiment, computing device 1102 may access application programs 1176 for execution in any manner, such as by a client application and/or a browser at computing device 1102. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 1102 may additionally and/or alternatively synchronize copies of application programs 1114 and/or application data 1116 to be stored at network-based server infrastructure 1170 as application programs 1176 and/or application data 1178. For instance, operating system 1112 and/or application programs 1114 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 1120 at network-based server infrastructure 1170.

In some embodiments, on-premises servers 1192 may be present in computing environment 1100 and may be communicatively coupled with computing device 1102 via network 1104. On-premises servers 1192, when present, are hosted within an organization's infrastructure and, in many cases, physically onsite of a facility of that organization. On-premises servers 1192 are controlled, administered, and maintained by IT (Information Technology) personnel of the organization or an IT partner to the organization. Application data 1198 may be shared by on-premises servers 1192 between computing devices of the organization, including computing device 1102 (when part of an organization) through a local network of the organization, and/or through further networks accessible to the organization (including the Internet). Furthermore, on-premises servers 1192 may serve applications such as application programs 1196 to the computing devices of the organization, including computing device 1102. Accordingly, on-premises servers 1192 may include storage 1194 (which includes one or more physical storage devices such as storage disks and/or SSDs) for storage of application programs 1196 and application data 1198 and may include one or more processors for execution of application programs 1196. Still further, computing device 1102 may be configured to synchronize copies of application programs 1114 and/or application data 1116 for backup storage at on-premises servers 1192 as application programs 1196 and/or application data 1198.

Embodiments described herein may be implemented in one or more of computing device 1102, network-based server infrastructure 1170, and on-premises servers 1192. For example, in some embodiments, computing device 1102 may be used to implement systems, clients, or devices, or components/subcomponents thereof, disclosed elsewhere herein. In other embodiments, a combination of computing device 1102, network-based server infrastructure 1170, and/or on-premises servers 1192 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1120. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1114) may be stored in storage 1120. Such computer programs may also be received via wired interface(s) 1180 and/or wireless modem(s) 1160 over network 1104. Such computer programs, when executed or loaded by an application, enable computing device 1102 to implement features of embodiments discussed herein. Accordingly, such computer programs represent controllers of the computing device 1102.

Embodiments are also directed to computer program products comprising computer code or instructions stored on any computer-readable medium or computer-readable storage medium. Such computer program products include the physical storage of storage 1120 as well as further physical storage types.

IV. Additional Example Embodiments

Systems, methods, and instrumentalities described herein enable using timestamps to prevent data tampering. Data, storage location, timestamp, and integrity metadata may be included with data encryption. A confidential computing system may include a trusted data generator, a trusted data validator, a trusted timestamp generator, and trusted timestamp storage. A trusted data generator may be configured to generate a concatenated data object including a data object and metadata, which may include a location indication and a timestamp (e.g., and an integrity value). The trusted timestamp generator encrypts the concatenated data object (e.g., using authenticated encryption), stores the encrypted concatenated data object (e.g., in untrusted storage) in accordance with a location indicated by the location indication, and protects the timestamp in trusted storage (e.g., by protecting at least the root timestamp). Concatenating an integrity value may be optional when using authenticated encryption.

A trusted data validator may be configured to retrieve a timestamp protected by trusted storage; retrieve an encrypted concatenated data object from a storage location in untrusted storage; decrypt the concatenated data object; extract the data object and metadata (e.g., location indication, second timestamp, and integrity value) from the decrypted concatenated data object; and validate the data object by confirming the metadata. The trusted data validator may compare the storage location to the location indication; compare the retrieved timestamp to the extracted timestamp; calculate a second integrity value based at least on the data object; and compare the second integrity value to the first integrity value.

A timestamp may be stored in a tree structure of timestamps. Addressing space can be partitioned into a tree structure, e.g., similar to a file system directory. Trusted communication links may be established. At least a timestamp of a root of the tree structure may be stored in trusted storage. As data is stored in untrusted storage, the timestamp in the directory above may be recorded. This process can continue back to the root, which is stored in trusted storage.

Unlike other trusted data implementations (e.g., Merkle Tree), timestamps may be compared without performing calculations, data may be validated with unequal comparisons, and comparisons and tolerances may be flexible, allowing for performance customization (e.g., security optimization). For example, a trusted data validator may be configured to validate an extracted timestamp if the extracted timestamp is equal to or greater than the timestamp retrieved from trusted storage.

A system is described herein. The system comprises a processor circuit and a memory. The memory stores program code that is executable by the processor circuit to perform methods described herein.

A computer-readable storage medium is described herein. The computer-readable storage medium has computer program logic recorded thereon that when executed by a processor circuit causes the processor circuit to perform methods described herein.

In another embodiment, a confidential computing system comprises: a processor; and a memory device that stores program code configured to be executed by the processor, the program code comprising: a trusted data generator configured to: generate a concatenated data object comprising a first data object, a first location indication, and a first timestamp; encrypt the concatenated data object as a first encrypted concatenated data object; store the first encrypted concatenated data object in untrusted storage in accordance with a first location indicated by the first location indication; and store the first timestamp in trusted storage.

In an embodiment, the trusted data generator is configured to: generate the concatenated data object comprising the first data object, the first location indication, the first timestamp, and an integrity value.

In an embodiment, the trusted data generator is configured to: store the first timestamp in a tree structure of timestamps, wherein at least a root timestamp of a root of the tree structure is stored in the trusted storage.

In an embodiment, the program code further comprises: a trusted data validator configured to: retrieve a second timestamp protected by the trusted storage; retrieve the encrypted concatenated data object from the untrusted storage in accordance with the first location; decrypt the encrypted concatenated data object; extract the first data object, the first location indication, and the first timestamp from the decrypted concatenated data object; and validate the first data object by: comparing the first location to the first location indication; and comparing the second timestamp to the first timestamp.

In an embodiment, the trusted data validator is further configured to: extract a first integrity value from the decrypted concatenated data object; and further validate the first data object by: calculating a second integrity value based at least on the first data object; and comparing the second integrity value to the first integrity value.

In an embodiment, the trusted data validator is configured to validate the second timestamp if the second timestamp is equal to or greater than the first timestamp.

In an embodiment, the program code further comprises: a trusted timestamp generator configured to generate the first timestamp for the trusted data generator.

In another embodiment, a method for writing data comprises: generating a concatenated data object comprising a data object, a location indication, and a timestamp; encrypting the concatenated data object; storing the encrypted concatenated data object in untrusted storage in accordance with a location indicated by the location indication; and protecting the timestamp in trusted storage.

In an embodiment, the concatenated data object comprises the data object, the location indication, the timestamp, and an integrity value.

In an embodiment, the method further comprises: calculating the integrity value based on the data object.

In an embodiment, the method further comprises: calculating the integrity value based on the data object, the location indication, and the timestamp.

In an embodiment, said encrypting the concatenated data object comprises encrypting the concatenated data object using authenticated encryption.

In an embodiment, said protecting the timestamp in trusted storage comprises storing the timestamp in a tree structure of timestamps, and wherein at least a root timestamp of a root of the tree structure is stored in the trusted storage.

In an embodiment, the timestamp is generated by a trusted timestamp server running in a trusted environment.

In another embodiment, a method for reading data comprises: retrieving a first timestamp protected by trusted storage; retrieving an encrypted concatenated data object from a storage location in untrusted storage; decrypting the concatenated data object; extracting a data object, a location indication, and a second timestamp from the decrypted concatenated data object; and validating the data object by: comparing the storage location to the location indication; and comparing the first timestamp to the second timestamp.

In an embodiment, the method further comprises: extracting a first integrity value from the decrypted concatenated data object; and further validating the data object by: calculating a second integrity value based at least on the data object; and comparing the second integrity value to the first integrity value.

In an embodiment, said calculating the second integrity value based at least on the data object comprises: calculating the second integrity value based on the data object, the location indication, and the timestamp.

In an embodiment, said decrypting the concatenated data object comprises decrypting the concatenated data object using authenticated encryption.

In an embodiment, said retrieving a first timestamp protected by trusted storage comprises: retrieving the first timestamp from a tree structure of timestamps, wherein at least a root timestamp of a root of the tree structure is stored in the trusted storage.

In an embodiment, the validation of the data object by comparing the first timestamp to the second timestamp comprises validating the time second timestamp if the second timestamp is equal to or greater than the first timestamp.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

For example, running examples have been described with respect to malicious activity detectors determining whether compute resource creation operations potentially correspond to malicious activity. However, it is also contemplated herein that malicious activity detectors may be used to determine whether other types of control plane operations potentially correspond to malicious activity.

Several types of impactful operations have been described herein; however, lists of impactful operations may include other operations, such as, but not limited to, accessing enablement operations, creating and/or activating new (or previously-used) user accounts, creating and/or activating new subscriptions, changing attributes of a user or user group, changing multi-factor authentication settings, modifying federation settings, changing data protection (e.g., encryption) settings, elevating another user account's privileges (e.g., via an admin account), retriggering guest invitation e-mails, and/or other operations that impact the cloud-base system, an application associated with the cloud-based system, and/or a user (e.g., a user account) associated with the cloud-based system.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A confidential computing system comprising:
- a processor; and
- a memory device that stores program code configured to be executed by the processor, the program code comprising:
  - a trusted data generator configured to:
    - generate a concatenated data object comprising a data object, a location indication, a first timestamp, and an integrity value, wherein the integrity value is calculated based on the data object, the location indication, and the first timestamp;
    - encrypt the concatenated data object as an encrypted concatenated data object;
    - store the encrypted concatenated data object in untrusted storage in accordance with a location indicated by the location indication;
    - store the first timestamp in a first directory of a tree structure of timestamps stored in the untrusted storage;
    - store a first directory timestamp of the first directory in a root directory of the tree structure of timestamps;
    - determine a first root timestamp for the root directory of the tree structure of timestamps; and
    - store the first root timestamp in trusted storage.

2. The confidential computing system of claim 1, the program code further comprising:
- a trusted data validator configured to:
  - retrieve the first root timestamp from the trusted storage;
  - retrieve the encrypted concatenated data object from the untrusted storage in accordance with the location;
  - decrypt the retrieved encrypted concatenated data object;
  - extract the data object, the location indication, and a second timestamp from the decrypted concatenated data object; and
  - validate the data object by:
    - comparing the location to the location indication; and
    - comparing a second root timestamp to the first root timestamp.

3. The confidential computing system of claim 2, wherein the trusted data validator is further configured to:
- extract a first integrity value from the decrypted concatenated data object; and
- further validate the data object by:
  - calculating a second integrity value based at least on the data object; and
  - comparing the second integrity value to the first integrity value.

4. The confidential computing system of claim 2, wherein the trusted data validator is configured to validate the second timestamp responsive to determining that the second timestamp is equal to or greater than the first timestamp.

5. The confidential computing system of claim 1, the program code further comprising:
- a trusted timestamp generator configured to generate the first timestamp for the trusted data generator.

6. The confidential computing system of claim 1, wherein the trusted data generator is further configured to:
- store a second directory timestamp of a second directory in a root directory of the tree structure of timestamps.

7. The confidential computing system of claim 1, wherein the location indication is one of:
- a globally unique identifier; or
- a logical block address for a disk sector.

8. The confidential computing system of claim 1, wherein the integrity value is a cyclic redundancy check value.

9. A method for writing data, comprising:
- generating a concatenated data object comprising a data object, a location indication, a first timestamp, and an integrity value, wherein the integrity value is calculated based on the data object, the location indication, and the first timestamp;
- encrypting the concatenated data object;
- storing the encrypted concatenated data object in untrusted storage in accordance with a location indicated by the location indication;
- storing the first timestamp in a first directory of a tree structure of timestamps stored in the untrusted storage;
- storing a first directory timestamp of the first directory in a root directory of the tree structure of timestamps;
- determining a root timestamp for the root directory of the tree structure of timestamps; and
- protecting the root timestamp in trusted storage.

10. The method of claim 9, wherein said encrypting the concatenated data object comprises encrypting the concatenated data object using authenticated encryption.

11. The method of claim 9, wherein the first timestamp is generated by a trusted timestamp server running in a trusted environment.

12. The method of claim 9, further comprising:
- storing a second directory timestamp of a second directory in a root directory of the tree structure of timestamps.

13. The method of claim 9, wherein the location indication is one of:
- a globally unique identifier; or
- a logical block address for a disk sector.

14. The method of claim 9, wherein the integrity value is a cyclic redundancy check value.

15. A method for reading data, comprising:

retrieving a root timestamp from trusted storage, the root timestamp associated with a root directory of a tree structure of timestamps stored in untrusted storage, the root directory of the tree structure of timestamps having stored a first directory timestamp associated with a first directory of the tree structure of timestamps and the first directory having stored a first timestamp associated with an encrypted concatenated data object;

retrieving the encrypted concatenated data object from a storage location in the untrusted storage;

decrypting the retrieved encrypted concatenated data object;

extracting a data object, a location indication, a second timestamp, and a first integrity value from the decrypted concatenated data object, wherein the first integrity value is calculated based on the data object, the location indication, and the second timestamp; and validating the data object by:

comparing the storage location to the location indication; and comparing the root timestamp to the second timestamp.

16. The method of claim 15, further comprising:

further validating the data object by:

calculating a second integrity value based at least on the data object; and comparing the second integrity value to the first integrity value.

17. The method of claim 15, wherein said decrypting the concatenated data object comprises decrypting the concatenated data object using authenticated decryption.

18. The method of claim 15, wherein the validation of the data object by comparing the root timestamp to the second timestamp comprises validating the second timestamp responsive to determining that the second timestamp is equal to or greater than the root timestamp.

19. The method of claim 15, further comprising:

storing a second directory timestamp of a second directory in a root directory of the tree structure of timestamps.

* * * * *